United States Patent
Chen et al.

(10) Patent No.: US 12,307,715 B2
(45) Date of Patent: May 20, 2025

(54) PARAMETER CALIBRATION METHOD AND APPARATUS

(71) Applicant: Shenzhen Yinwang Intelligent Technologies Co., Ltd., Shenzhen (CN)

(72) Inventors: Yilun Chen, Shenzhen (CN); Han Li, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 17/854,506

(22) Filed: Jun. 30, 2022

(65) Prior Publication Data

US 2022/0358679 A1    Nov. 10, 2022

Related U.S. Application Data

(63) Continuation of application No. PCT/CN2019/129932, filed on Dec. 30, 2019.

(51) Int. Cl.
*G06K 9/00* (2022.01)
*G06T 7/73* (2017.01)
*G06T 7/80* (2017.01)

(52) U.S. Cl.
CPC . *G06T 7/80* (2017.01); *G06T 7/73* (2017.01)

(58) Field of Classification Search
CPC .................................. G06T 7/80; G06T 7/73
See application file for complete search history.

(56) References Cited

U.S. PATENT DOCUMENTS

| | | | | |
|---|---|---|---|---|
| 6,527,395 B1* | 3/2003 | Raskar | ................. | H04N 9/3185 |
| | | | | 353/70 |
| 8,619,144 B1* | 12/2013 | Chang | ................. | H04N 17/002 |
| | | | | 348/187 |
| 8,768,046 B2* | 7/2014 | Ernst | ....................... | G06T 7/251 |
| | | | | 382/154 |
| 9,338,447 B1* | 5/2016 | Crump | .................... | H04N 17/02 |
| 9,483,849 B2* | 11/2016 | Choi | ....................... | H04N 23/71 |
| 10,510,162 B2* | 12/2019 | Doganis | ................... | G06T 7/80 |
| 10,715,705 B2* | 7/2020 | Zhang | .................... | H04N 23/60 |

(Continued)

FOREIGN PATENT DOCUMENTS

| | | |
|---|---|---|
| CN | 101527040 A | 9/2009 |
| CN | 101998136 A | 3/2011 |

(Continued)

*Primary Examiner* — Shervin K Nakhjavan
(74) *Attorney, Agent, or Firm* — Conley Rose, P.C.

(57) ABSTRACT

This application provides a parameter calibration method and apparatus, which may be applied to calibration of an intrinsic parameter and an extrinsic parameter of an image shooting device. According to the method and apparatus, with a position of a calibration pattern fixed, a position and an angle of the image shooting device relative to the calibration pattern are accurately adjusted by changing a pose parameter of the image shooting device, so that the image shooting device photographs the calibration pattern at each given position and angle relative to the calibration pattern, to obtain at least one shooting result. The shooting result can correspond to coordinate in a pixel coordinate system and a world coordinate system, so that accuracy of an intrinsic parameter and an extrinsic parameter is correspondingly calculated.

22 Claims, 18 Drawing Sheets

(56) References Cited

U.S. PATENT DOCUMENTS

| | | | |
|---|---|---|---|
| 10,937,129 B1* | 3/2021 | Fix | G06V 40/19 |
| 10,964,107 B2* | 3/2021 | Huang | G01B 11/2504 |
| 11,173,609 B2* | 11/2021 | Lee | B25J 9/0084 |
| 11,528,410 B2* | 12/2022 | Okuhara | G06T 7/80 |
| 11,657,535 B2* | 5/2023 | Hu | G06T 7/80 |
| | | | 382/172 |
| 2008/0285854 A1* | 11/2008 | Kotake | G06T 7/73 |
| | | | 382/190 |
| 2010/0302366 A1 | 12/2010 | Zhao et al. | |
| 2010/0315512 A1 | 12/2010 | Li et al. | |
| 2017/0032529 A1* | 2/2017 | De Villiers | B25J 9/1697 |
| 2017/0053405 A1* | 2/2017 | Desai | A61B 6/582 |
| 2017/0287166 A1* | 10/2017 | Claveau | G06T 7/80 |
| 2017/0374360 A1 | 12/2017 | Kranski et al. | |
| 2019/0132560 A1* | 5/2019 | Grosse | H04N 17/002 |
| 2019/0320166 A1* | 10/2019 | Forster | G06T 7/80 |
| 2019/0379806 A1 | 12/2019 | Zhang et al. | |
| 2021/0124174 A1* | 4/2021 | Tokunaga | H04N 23/10 |
| 2021/0209777 A1* | 7/2021 | Zhao | H04N 21/234 |
| 2022/0270294 A1* | 8/2022 | Bao | G06T 7/13 |
| 2022/0276360 A1* | 9/2022 | Ma | G06T 7/80 |

FOREIGN PATENT DOCUMENTS

| | | | | |
|---|---|---|---|---|
| CN | 106887023 A | 6/2017 | | |
| CN | 108942934 A | 12/2018 | | |
| CN | 109416744 A | 3/2019 | | |
| EP | 3264360 A1 | 1/2018 | | |
| JP | 2018189580 A | * 11/2018 | | G06T 7/80 |
| WO | WO-2020010945 A1 | * 1/2020 | | G06T 7/80 |

\* cited by examiner

Tangential distortion   Radial distortion (bucket)   Radial distortion (fisheye)

First calibration pattern    Second calibration pattern

First calibration pattern    Second calibration pattern

Before feature point adjustment

After feature point adjustment

Grayscale  Standard color  Color stripe

PARAMETER CALIBRATION METHOD AND APPARATUS

CROSS-REFERENCE TO RELATED APPLICATIONS

This application is a continuation of International Patent Application No. PCT/CN2019/129932, filed on Dec. 30, 2019, the disclosure of which is hereby incorporated by reference in its entirety.

TECHNICAL FIELD

The present disclosure relates to the field of optical technologies, and in particular, to a parameter calibration method and apparatus.

BACKGROUND

In practical application of technologies such as machine vision/computer vision, to determine a relationship between a three-dimensional geometric position of a point on a surface of a space object and its corresponding point in an image captured by a camera, a geometric model of camera imaging is established. Parameters of the geometric model may be generalized as camera parameters (or photographing device parameters). In most cases, the camera parameters can be obtained only through experiments and calculations. A process of solving camera parameters through experiments and calculations is referred to as camera calibration (or photographing device calibration).

In a current camera calibration method, a to-be-calibrated camera is fixed, and then a calibration board is placed in a field of view of the camera by hand. The calibration board is moved to change an angle and a position of the calibration board, so that the camera captures images of the calibration board with different angles and positions. Finally, an intrinsic parameter and an extrinsic parameter of the camera are solved by using a real position of a feature point of the calibration board in a three-dimensional world and a position of the feature point of the calibration board in the image captured by the camera.

At present, the calibration board is obtained through printing on boards of various materials, whose flatness and printing precision affect precision of a world coordinate system. When the flatness and the printing precision are low, the precision of the world coordinate system is low, which affects calibration precision. In addition, the way of manually moving the calibration board makes the position of the calibration board hard to be accurately determined, which also affects the calibration precision.

SUMMARY

The present disclosure provides a parameter calibration method and apparatus to improve calibration precision of an image shooting device.

According to a first aspect, the present disclosure provides a parameter calibration method. The method includes generating a first calibration pattern; sending a first instruction, where the first instruction is used to indicate at least one group of pose parameters of at least one image shooting device in a first time period; sending a second instruction to the at least one image shooting device, where the second instruction is used to indicate at least one of a shooting occasion and a quantity of shooting times of the at least one image shooting device in the first time period; obtaining at least one shooting result from the at least one image shooting device; and determining at least one intrinsic parameter of the at least one image shooting device based on some or all of the at least one shooting result, where any one of the some or all of the at least one shooting result includes a part or all of the first calibration pattern.

The parameter calibration method provided in the present disclosure may be applied to calibration of an intrinsic parameter and an extrinsic parameter of an image shooting device. According to the method, with a position of a calibration pattern fixed, a position and an angle of the image shooting device relative to the calibration pattern are accurately adjusted by changing a pose parameter of the image shooting device, so that the image shooting device accurately photographs the calibration pattern at each given position and angle relative to the calibration pattern, to obtain at least one shooting result. The shooting result can accurately correspond to coordinates in a pixel coordinate system and a world coordinate system, so that accuracy of an intrinsic parameter and an extrinsic parameter that are correspondingly calculated is higher, and calibration precision is improved.

In an implementation, the sending a first instruction includes sending the first instruction to a motion mechanism, where the motion mechanism carries the at least one image shooting device, and the at least one group of pose parameters is used by the motion mechanism to control a pose of the at least one image shooting device. Therefore, the motion mechanism can accurately control the pose of the image shooting device based on the pose parameter, and can implement pose reproduction, thereby helping improve calibration precision.

In an implementation, the shooting result includes at least one photo and/or at least one video from the at least one image shooting device captured in response to the second instruction. Therefore, an image that participates in calculating the intrinsic parameter of the image shooting device may be selected from the photo, or may be selected from a video frame of the video. The manner is flexible.

In an implementation, the sending a first instruction includes sending a plurality of first instructions in the first time period; and the sending a second instruction to the at least one image shooting device includes sending a plurality of second instructions to the at least one image shooting device in the first time period, where the plurality of first instructions and the plurality of second instructions are sent alternately. Therefore, the image shooting device may be instructed based on an actual requirement by using the first instructions and the second instructions to capture different photos or videos in different poses, for example, placing the first calibration pattern at different positions in a field of view of the image shooting device, to improve calibration precision.

In an implementation, at least one parameter in the intrinsic parameter has a corresponding error threshold, and when repetition precision of the at least one parameter in the intrinsic parameter is greater than the corresponding error threshold, the method further includes adjusting the first calibration pattern to a second calibration pattern, and/or adjusting a quantity of feature points that are extracted from the at least one shooting result and that correspond to each field of view of the at least one image shooting device, and/or adjusting image quality of the first calibration pattern. Therefore, in the present disclosure, a plurality of calibrations may be performed on the image shooting device, so that an intrinsic parameter matrix and an extrinsic parameter matrix of the image shooting device are continuously updated iteratively, and calibration precision is continuously improved until a value of the calibration precision is less than a corresponding threshold.

In an implementation, quantities and/or sizes of markers in the first calibration pattern and the second calibration pattern are different.

In an implementation, the adjusting a quantity of feature points that are extracted from the at least one shooting result and that correspond to each field of view of the at least one image shooting device includes determining at least one sub-area included in the first calibration pattern, and performing uniformity adjustment on a quantity of feature points in the at least one sub-area. Therefore, quantities of feature points in sub-areas tend to be uniform, to improve calibration precision.

In an implementation, the first calibration pattern is a preset grayscale pattern, and the intrinsic parameter includes a white balance parameter of the at least one image shooting device.

In an implementation, the first calibration pattern is a preset monochrome pattern, and the intrinsic parameter includes a halo parameter of the at least one image shooting device.

In an implementation, the first calibration pattern is a preset color card pattern including a plurality of standard colors, and the intrinsic parameter includes a chromatic aberration parameter of the at least one image shooting device.

In an implementation, the first calibration pattern is a preset calibration board pattern including lines of different angles, and the intrinsic parameter includes a modulation transfer function parameter of the at least one image shooting device.

According to a second aspect, the present disclosure provides a parameter calibration apparatus. The apparatus includes a generation unit configured to generate a first calibration pattern; a first sending unit configured to send a first instruction, where the first instruction is used to indicate at least one group of pose parameters of at least one image shooting device in a first time period; a second sending unit configured to send a second instruction to the image shooting device, where the second instruction is used to indicate at least one of a shooting occasion and a quantity of shooting times of the at least one image shooting device in the first time period; an obtaining unit configured to obtain at least one shooting result from the at least one image shooting device; and a processing unit configured to determine at least one intrinsic parameter of the at least one image shooting device based on some or all of the at least one shooting result, where any one of the some or all of the at least one shooting result includes a part or all of the first calibration pattern.

The parameter calibration apparatus provided in the present disclosure may be applied to calibration of an intrinsic parameter and an extrinsic parameter of an image shooting device. According to the method, with a position of a calibration pattern fixed, a position and an angle of the image shooting device relative to the calibration pattern are accurately adjusted by changing a pose parameter of the image shooting device, so that the image shooting device accurately photographs the calibration pattern at each given position and angle relative to the calibration pattern, to obtain at least one shooting result. The shooting result can accurately correspond to coordinates in a pixel coordinate system and a world coordinate system, so that accuracy of an intrinsic parameter and an extrinsic parameter that are correspondingly calculated is higher, and calibration precision is improved.

In an implementation, the first sending unit is further configured to send the first instruction to a motion mechanism, where the motion mechanism carries the at least one image shooting device, and the at least one group of pose parameters is used by the motion mechanism to control a pose of at least one shooting parameter. Therefore, the motion mechanism can accurately control the pose of the image shooting device based on the pose parameter, and can implement pose reproduction, thereby helping improve calibration precision.

In an implementation, the shooting result includes at least one photo and/or at least one video from the at least one image shooting device captured in response to the second instruction. Therefore, an image that participates in calculating the intrinsic parameter of the image shooting device may be selected from the photo, or may be selected from a video frame of the video. The manner is flexible.

In an implementation, the first sending unit is configured to send a plurality of first instructions in the first time period; and the second sending unit is configured to send a plurality of second instructions to the at least one image shooting device in the first time period, where the plurality of first instructions and the plurality of second instructions are sent alternately. Therefore, the image shooting device may be instructed based on a requirement by using the first instructions and the second instructions to capture different photos or videos in different poses, for example, placing the first calibration pattern at different positions in a field of view of the image shooting device, to improve calibration precision.

In an implementation, at least one parameter in the intrinsic parameter has a corresponding error threshold; the processing unit is configured to determine whether repetition precision of the at least one parameter in the intrinsic parameter is greater than the corresponding error threshold; the generation unit is configured to when the repetition precision is greater than the corresponding error threshold, adjust the first calibration pattern to a second calibration pattern, and/or adjust image quality of the first calibration pattern; and the processing unit is configured to: when the repetition precision is greater than the corresponding error threshold, adjust a quantity of feature points that are extracted from the at least one shooting result and that correspond to each field of view of the at least one image shooting device. Therefore, in the present disclosure, a plurality of calibrations may be performed on the image shooting device, so that an intrinsic parameter matrix and an extrinsic parameter matrix of the image shooting device are continuously updated iteratively, and calibration precision is continuously improved until a value of the calibration precision is less than a corresponding threshold.

In an implementation, quantities and/or sizes of markers in the first calibration pattern and the second calibration pattern are different.

In an implementation, the processing unit is configured to determine at least one sub-area included in the first calibration pattern, and perform uniformity adjustment on a quantity of feature points in the at least one sub-area. Therefore, quantities of feature points in sub-areas tend to be uniform, to improve calibration precision.

In an implementation, the first calibration pattern is a preset grayscale pattern, and the intrinsic parameter includes a white balance parameter of the at least one image shooting device.

In an implementation, the first calibration pattern is a preset monochrome pattern, and the intrinsic parameter includes a halo parameter of the at least one image shooting device.

In an implementation, the first calibration pattern is a preset color card pattern including a plurality of standard colors, and the intrinsic parameter includes a chromatic aberration parameter of the at least one image shooting device.

In an implementation, the first calibration pattern is a preset calibration board pattern including lines of different angles, and the intrinsic parameter includes a modulation transfer function parameter of the at least one image shooting device.

According to a third aspect, the present disclosure provides a parameter calibration apparatus. The apparatus includes a memory and a processor; the memory is coupled to the processor; and the memory is configured to store computer program code, the computer program code includes computer instructions, and when the processor executes the computer instructions, the apparatus is enabled to perform the method according to any one of the first aspect and the implementations of the first aspect.

According to a fourth aspect, the present disclosure provides a parameter calibration system. The system includes: a control device configured to generate a first calibration pattern; a display screen, coupled to the control device, and configured to display the first calibration pattern; and a motion mechanism configured to carry at least one image shooting device, so that a field of view of the at least one image shooting device faces the display screen, where the motion mechanism is coupled to the control device. The control device is further configured to send a first instruction to the motion mechanism. The first instruction is used to indicate at least one group of pose parameters of the at least one image shooting device in a first time period. The motion mechanism is further configured to control a pose of the at least one image shooting device based on the at least one group of pose parameters. The control device is further configured to send a second instruction to the at least one image shooting device, where the second instruction is used to indicate at least one of a shooting occasion and a quantity of shooting times of the at least one image shooting device in the first time period; obtain at least one shooting result from the at least one image shooting device; and determine at least one intrinsic parameter of the at least one image shooting device based on some or all of the at least one shooting result, where any one of the some or all of the at least one shooting result includes a part or all of the first calibration pattern.

According to a fifth aspect, the present disclosure further provides a computer storage medium. The computer storage medium stores a computer instruction. When the computer instruction is run on a control device, the control device is enabled to perform the method according to any one of the first aspect and the implementations of the first aspect.

According to a sixth aspect, the present disclosure further provides a computer program product including instructions. When the instructions are run on a computer, the computer is enabled to perform the method according to any one of the first aspect and the implementations of the first aspect.

According to a seventh aspect, the present disclosure further provides a chip system. The chip system includes a processor configured to support the foregoing apparatus or device in implementing a function in any one of the first aspect and the implementations of the first aspect, for example, generating or processing information in the foregoing method.

DESCRIPTION OF EMBODIMENTS

In the technical field such as machine vision/computer vision, a camera is usually used to image an object and a scene in an objective world, to perform three-dimensional reconstruction on the objective object and scene based on the imaging of the camera, and implement three-dimensional recognition of the objective world by using a machine, for example, recognize a shape, a size, a distance from an observation point, a texture, and a motion feature of the object. The machine vision/computer vision technology may be applied to the fields such as virtual reality, an advanced driving assistant system, an unmanned aerial vehicle cruise system, vision detection, biometric feature recognition, distance measurement, and three-dimensional reconstruction. In recent years, the machine vision/computer vision technology has been continuously developed with the growing popularity of products such as smartphones, tablet computers, virtual reality devices, automobiles with a driving assistant system, and unmanned aerial vehicles.

In practical application of technologies such as machine vision/computer vision, to determine a relationship between a three-dimensional geometric position of a point on a surface of a space object and its corresponding point in an image captured by the camera, a geometric model of camera imaging is established. Parameters of the geometric model may be generalized as camera parameters (or photographing device parameters). In most cases, the camera parameters can be obtained only through experiments and calculations. A process of solving camera parameters through experiments and calculations is referred to as camera calibration (or photographing device calibration). Camera calibration is an important part in the field such as machine vision and computer vision. Precision of a calibration result and stability of an algorithm directly affect accuracy of an image inference result. Therefore, camera calibration is the prerequisite for subsequent work, and quick and accurate camera calibration is the basis for improving subsequent work efficiency.

The following specifically describes a basic principle of camera calibration and related main technical concepts with reference to some accompanying drawings and texts. It should be noted that, in different expression manners and habits, some technical concepts may be expressed in different manners. For example, one concept may be expressed as a plurality of sub-concepts, or several concepts may be summarized as one or more other concepts through splitting or combination. These expression manners are merely changes in habits, and do not make a substantive difference from the embodiments of the present disclosure.

Figure 1:
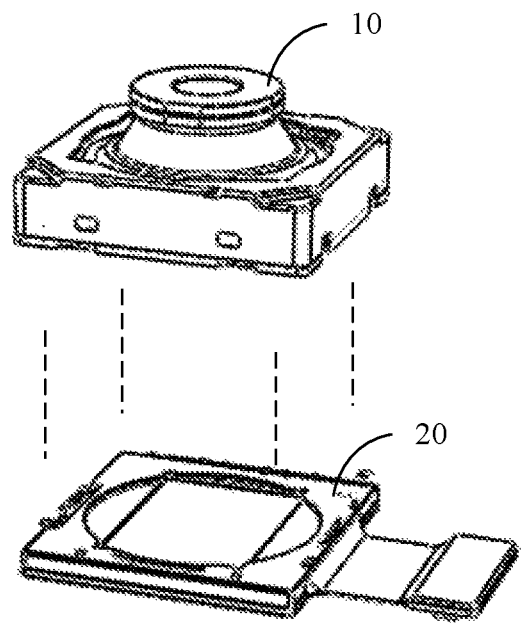
FIG. 1 is a schematic diagram of a basic structure of a camera.

FIG. 1 is a schematic diagram of a basic structure of a camera. As shown in FIG. 1, the camera includes an optical lens 10 and a photoelectric sensor 20. The optical lens 10 is configured to project an optical image of a space object onto the photoelectric sensor 20. The photoelectric sensor 20 is configured to convert an optical signal projected by the optical lens 10 into an electrical signal, and finally form an image through processing by using another component such as an image signal sensor. Generally, the photoelectric sensor 20 may include a charge-coupled device (CCD), a complementary metal-oxide-semiconductor (CMOS) active pixel sensor, or the like.

Figure 2:
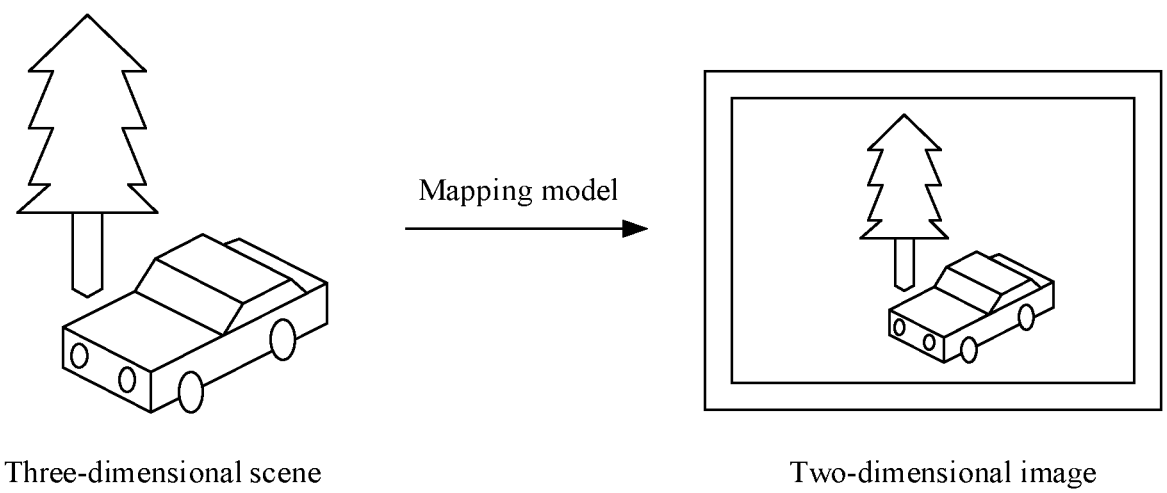
FIG. 2 is a schematic diagram of mapping an object from a three-dimensional scene to a two-dimensional image.

As shown in FIG. 2, an object in real space is three-dimensional, while an object in an image corresponding to the object is two-dimensional. Therefore, it may be considered that a three-dimensional to two-dimensional mapping model exists between an object in a three-dimensional scene and a two-dimensional image corresponding to the object, and the mapping model enables a three-dimensional to two-dimensional or two-dimensional to three-dimensional conversion between the object in the three-dimensional scene and the image corresponding to the object. In this case, it is easy to understand that when the camera captures the image of the object in the three-dimensional scene, the camera may be considered as the mapping model, and a camera parameter is a parameter of the mapping model. Therefore, provided that the camera parameter is obtained, world coordinates of the object in the space can be inferred reversely from pixel coordinates of the object in the image, to implement functions such as visual detection, biometric feature recognition, distance measurement, and three-dimensional reconstruction.

Generally, camera calibration is related to the following concepts:

An intrinsic parameter of the camera (referred to as a camera intrinsic parameter for short) refers to a parameter related to a feature of the camera, and may be determined by using positions at which the optical lens, the photoelectric sensor, and the like are installed in a camera module. The camera intrinsic parameter may include at least one of parameters such as a focal length, a pixel size, an optical distortion, a white balance, a resolution, a contrast, a halo, and a dark angle.

An extrinsic parameter of the camera (referred to as a camera extrinsic parameter for short) may include at least one of the following:

A world coordinate system, also referred to as a measurement coordinate system, is a three-dimensional rectangular coordinate system, and may be used as a reference to describe spatial positions of the camera and a to-be-measured object in the objective world. A position of the world coordinate system may be determined based on an actual situation.

The extrinsic parameter of the camera and the intrinsic parameter of the camera are collectively referred to as a camera parameter.

A camera coordinate system is a three-dimensional rectangular coordinate system with an origin being located at an optical center of the optical lens (the optical center is a center point of a lens of the optical lens), an x-axis and a y-axis being respectively parallel to two sides of an image plane of the camera, and a z-axis being an optical axis of the optical lens and perpendicular to the image plane.

A pixel coordinate system is a two-dimensional rectangular coordinate system, and reflects pixel arrangement in a CCD/CMOS chip of the camera. An origin of the pixel coordinate system is located at an upper left corner of the image, and a u-axis and a v-axis are respectively parallel to two sides of the image plane. A unit of the coordinate axes in the pixel coordinate system is a pixel (an integer).

An image coordinate system is a two-dimensional rectangular coordinate system with a unit of coordinate axes being usually a millimeter (mm), an origin being an intersection point (referred to as a primary point) of the optical axis of the camera and the image plane, that is, a center point of the image, and an X-axis and a Y-axis being respectively parallel to the u-axis and the v-axis of the pixel coordinate system. The image coordinate system and the pixel coordinate system are in a translation relationship, that is, can be obtained through translation of each other.

Figure 3:
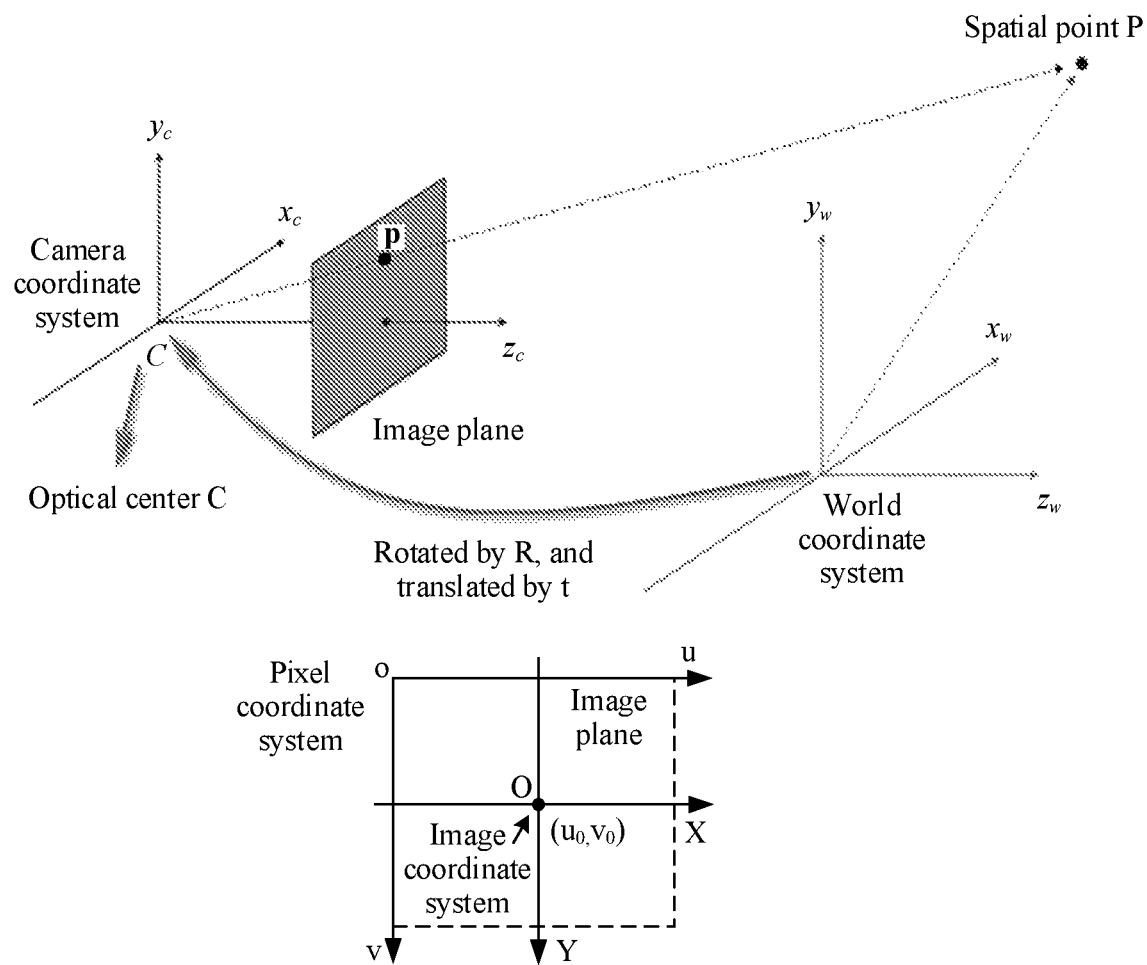
FIG. 3 is a schematic diagram of conversion relationships between coordinate systems.

FIG. 3 is a schematic diagram of conversion relationships between coordinate systems. The following describes conversion relationships between the coordinate systems with reference to FIG. 3, and then describes in detail a camera parameter that needs to be calibrated in the embodiments of the present disclosure.

1. The world coordinate system may be converted to the camera coordinate system through the following matrix transformation:

$$\begin{bmatrix} x_c \\ y_c \\ z_c \\ 1 \end{bmatrix} = \begin{bmatrix} R & t \\ 0 & 1 \end{bmatrix} * \begin{bmatrix} x_w \\ y_w \\ z_w \\ 1 \end{bmatrix}$$

where R is a 3*3 rotation matrix, t is a 3*1 translation vector, $(x_c, y_c, z_c, 1)^T$ are coordinates in the camera coordinate system, and $(x_w, y_w, z_w, 1)^T$ are coordinates in the world coordinate system. Therefore, the conversion from the world coordinate system to the camera coordinate system actually includes a rotation process and a translation process.

2. The image coordinate system may be converted to the pixel coordinate system through the following matrix transformation:

$$\begin{bmatrix} u \\ v \\ 1 \end{bmatrix} = \begin{bmatrix} 1/dX & 0 & u_0 \\ 0 & 1/dY & v_0 \\ 0 & 0 & 1 \end{bmatrix} * \begin{bmatrix} X \\ Y \\ 1 \end{bmatrix}$$

where $(X, Y, 1)^T$ are coordinates in the image coordinate system, $(u, v, 1)^T$ are coordinates in the pixel coordinate system, dX and dY are respectively physical dimensions of a pixel in an X-axis direction and a Y-axis direction, and $u_0$ and $v_0$ are coordinates of the optical center.

3. Conversion from the camera coordinate system to the image coordinate system is a process of perspective projection, as shown in FIG. 3.

For example, a connection line between any point P in the space and the optical center C of the camera is CP, and an intersection point p between CP and the image plane is a projection of the spatial point P on the image plane. The projection may be implemented through the following matrix transformation:

$$s * \begin{bmatrix} X \\ Y \\ 1 \end{bmatrix} = \begin{bmatrix} f & 0 & 0 & 0 \\ 0 & f & 0 & 0 \\ 0 & 0 & 1 & 0 \end{bmatrix} * \begin{bmatrix} x_c \\ y_c \\ z_c \\ 1 \end{bmatrix}$$

where S is a scale factor (S is not 0), f is an effective focal length (a distance from the optical center to the image plane), $(x_c, y_c, z_c, 1)^T$ are coordinates of the spatial point P in the camera coordinate system, and $(X, Y, 1)^T$ are coordinates of the image point p in the image coordinate system.

4. Conversion from the world coordinate system to the pixel coordinate system is as follows:

Based on conversion matrices between the coordinate systems shown in 1 to 3 above, the world coordinate system may be converted to the pixel coordinate system through the following matrix transformation:

$$S * \begin{bmatrix} u \\ v \\ 1 \end{bmatrix} = \begin{bmatrix} 1/dX & 0 & u_0 \\ 0 & 1/dY & v_0 \\ 0 & 0 & 1 \end{bmatrix} * \begin{bmatrix} f & 0 & 0 \\ 0 & f & 0 \\ 0 & 0 & 1 & 0 \end{bmatrix} * \begin{bmatrix} R & t \\ 0 & 1 \end{bmatrix} * \begin{bmatrix} x_w \\ y_w \\ z_w \\ 1 \end{bmatrix} = \begin{bmatrix} a_x & 0 & u_0 & 0 \\ 0 & a_y & v_0 & 0 \\ 0 & 0 & 1 & 0 \end{bmatrix} * \begin{bmatrix} R & t \\ 0 & 1 \end{bmatrix} = M_1 M_2 X_w = M X_w \quad (1)$$

where $M_1 = \begin{bmatrix} a_x & 0 & u_0 & 0 \\ 0 & a_y & v_0 & 0 \\ 0 & 0 & 1 & 0 \end{bmatrix}$ $M_2 = \begin{bmatrix} R & t \\ 0 & 1 \end{bmatrix}$ $M = M_1 M_2$.

In the foregoing matrices, M is a parameter matrix of the camera, that is, camera parameters. $M_1$ is an intrinsic parameter matrix of the camera, that is, intrinsic parameters of the camera. $M_2$ is an extrinsic parameter matrix of the camera, that is, extrinsic parameters of the camera. Camera calibration includes solving the intrinsic parameter matrix $M_1$ and/or the extrinsic parameter matrix $M_2$, for example, solving parameters such as the pixel size 1/dX and 1/dY of the camera, the focal length f of the camera, the position ($v_0$, $u_0$) of the optical center of the camera, the rotation matrix R, and a translation variable.

Figure 4:
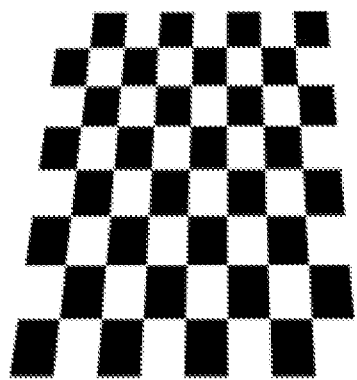
FIG. 4 is a schematic diagram of distortions of a camera.
Figure 4:
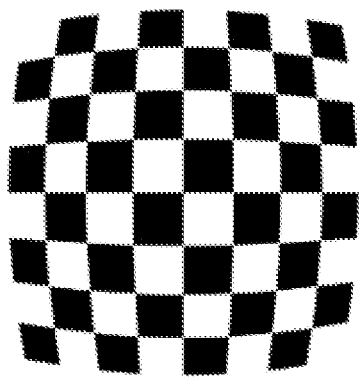
Figure 4:
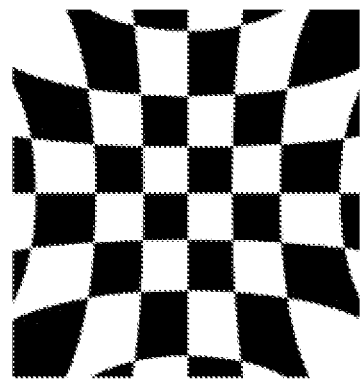

It should be additionally noted that, actual imaging of the camera usually has a deformation, which may be referred to as a distortion. As shown in FIG. 4, the distortion may be specifically classified into a tangential distortion and a radial distortion. The radial distortion comes from the lens of the camera, which is caused by impact of a "fisheye" and a "bucket", and is severer at an edge of lens imaging. The tangential distortion is caused when the lens is not parallel to the image plane due to a disadvantage in lens manufacturing or a deviation in installation. When the tangential distortion and the radial distortion are considered, the matrix transformation shown in 1 to 3 above may be further extended as follows:

$$x'_c = x_c/z_c$$

$$y'_c = y_c/z_c$$

$$x''_c = x'_c \frac{1 + k_1 r^2 + k_2 r^4 + k_3 r^6}{1 + k_4 r^2 + k_5 r^4 + k_6 r^6} + 2 p_1 x'_c y'_c + p_2(r^2 + 2 x'^2_c)$$

$$y''_c = y'_c \frac{1 + k_1 r^2 + k_2 r^4 + k_3 r^6}{1 + k_4 r^2 + k_5 r^4 + k_6 r^6} + 2 p_2 x'_c y'_c + p_1(r^2 + 2 y'^2_c)$$

$$r^2 = x'^2_c + y'^2_c$$

where $k_1$, $k_2$, $k_3$, $k_4$, $k_5$, and $k_6$ are radial distortion coefficients, and $p_1$ and $p_2$ are tangential distortion coefficients. Therefore, in a camera calibration process, a distortion parameter of the camera may be further determined.

Figure 5:
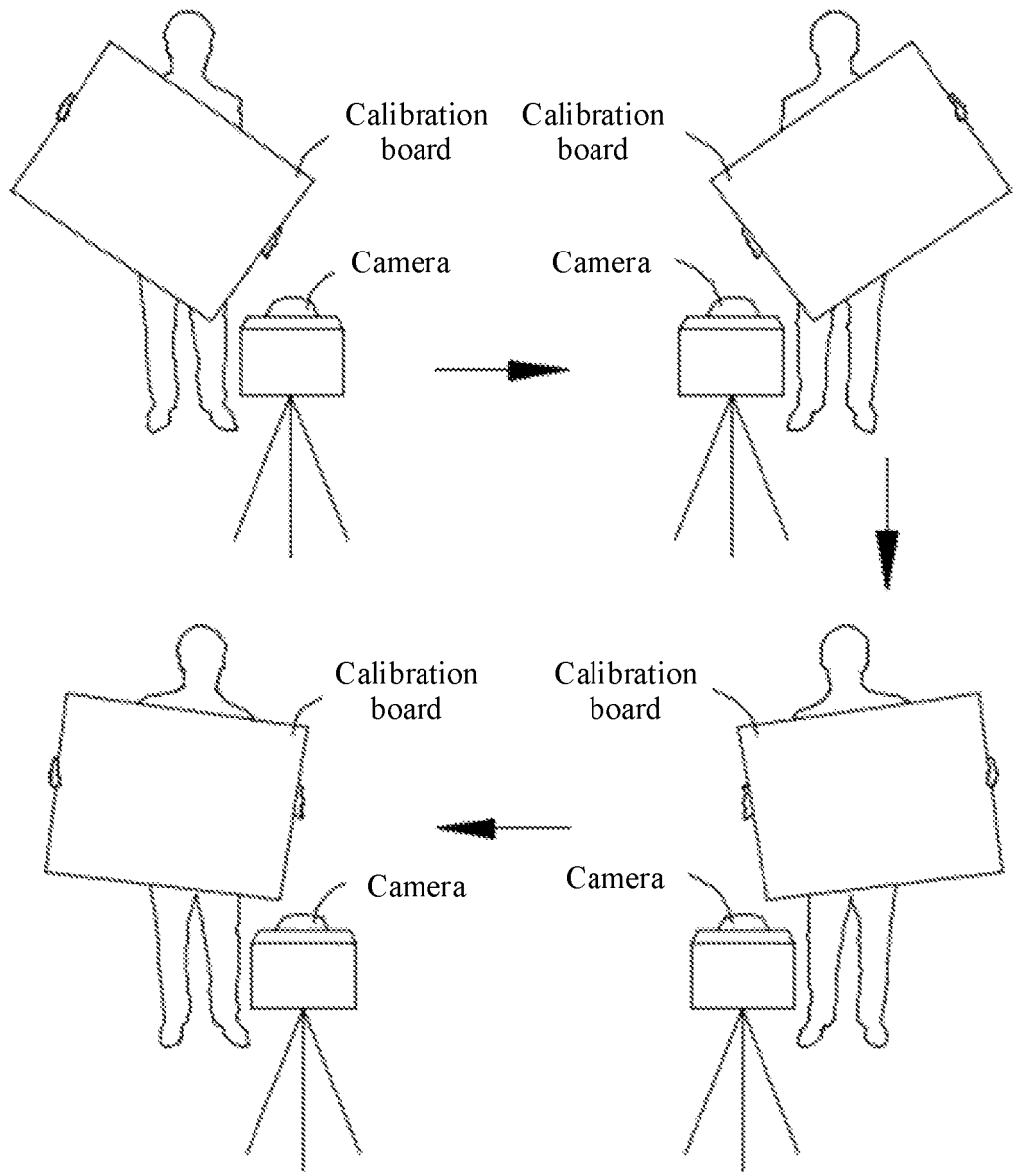
FIG. 5 is a schematic diagram of a camera calibration method.

To solve a camera parameter, in a laboratory environment, a camera calibration method is shown in FIG. 5. First, a to-be-calibrated camera is fixed at a position in a laboratory space environment. Then, a calibration board is placed in a field of view of the camera by hand. The calibration board is moved to change an angle and a position of the calibration board, so that the camera can capture an image of the calibration board in different poses relative to the calibration board. Finally, an intrinsic parameter and an extrinsic parameter of the camera are solved by using a real position of a feature point of the calibration board in a three-dimensional world (that is, coordinates of the feature point in a world coordinate system) and a position of the feature point of the calibration board in the image captured by the camera (that is, coordinates of the feature point in a pixel coordinate system of the image). For industrial camera calibration, a large robot arm is usually required, and a calibration board is hoisted onto the large robot arm. An angle and a position of the calibration board are changed through an arm swinging action of the robot arm. However, the arm swinging of the robot arm and posture stability after the arm swinging are time-consuming. Consequently, the camera calibration has low efficiency and cannot be widely applied.

Figure 6:
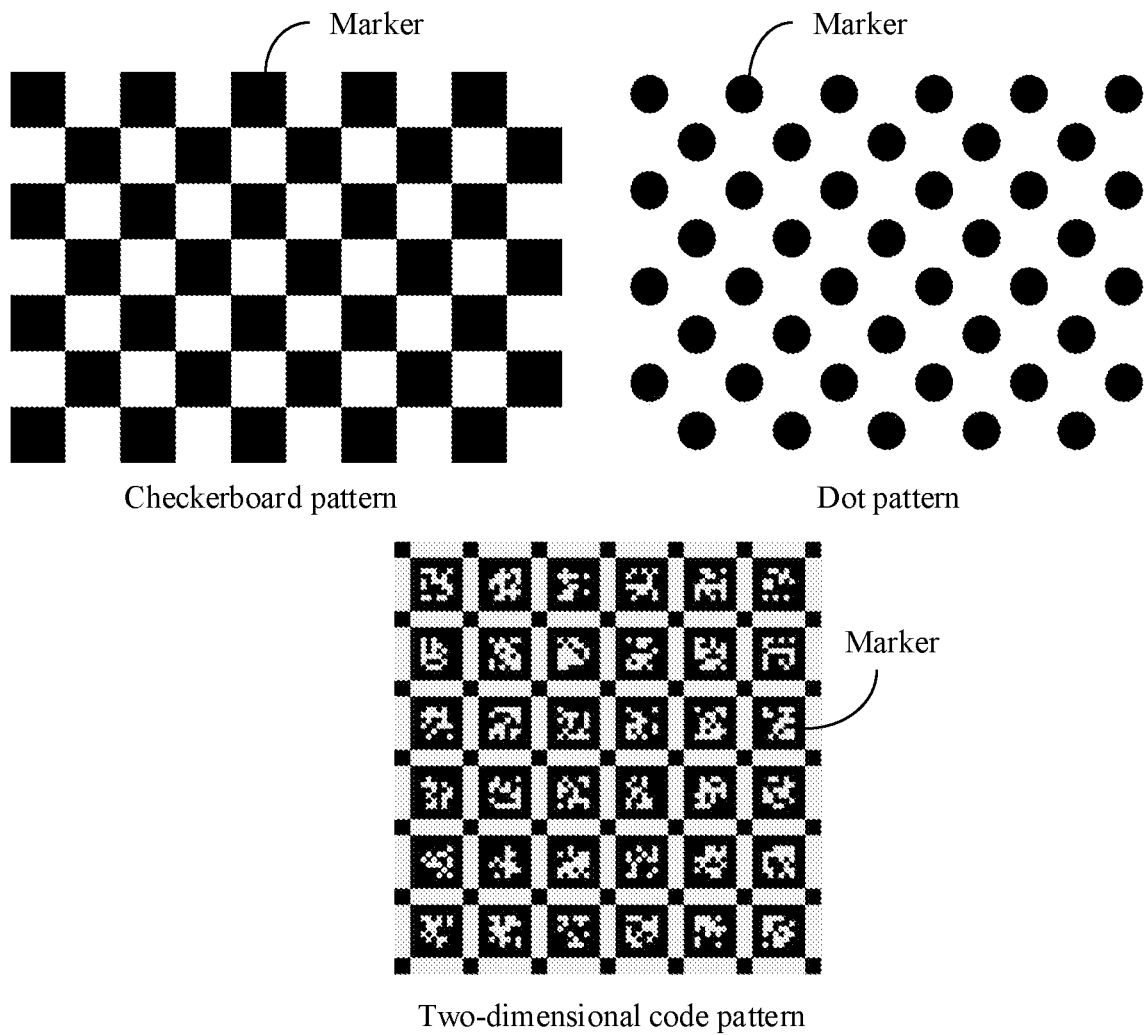
FIG. 6 is a schematic diagram of some calibration boards according to an embodiment of the present disclosure.

FIG. 6 is a schematic diagram of some calibration boards according to an embodiment of the present disclosure. As shown in FIG. 6, a checkerboard pattern, a dot pattern, a two-dimensional code pattern, or another specific pattern may be printed on a calibration board. Any pattern unit, for example, any square of the checkerboard pattern or any dot of the dot pattern, on the calibration board may be referred to as a marker. Some feature points may be determined from markers to calculate a camera parameter. In addition to the calibration boards shown in FIG. 6, to calibrate another parameter of the camera, a calibration board in another form may be used. For example, a white balance parameter of the camera is calibrated by using a calibration board including a color card, and a halo parameter of the camera is calibrated by using a calibration board of a uniform diffuse reflection material in collaboration with a light source with uniform illumination, and an optical resolution modulation transfer function (MTF) of the camera is calibrated by using a calibration board including a special design pattern.

The parameter calibration method shown with reference to FIG. 5 and FIG. 6 has the following problems in practical application:

Because the calibration board is obtained through printing on boards of various materials, and flatness and printing precision of the calibration boards affect precision of the world coordinate system, when the flatness and the printing precision are low, the precision of the world coordinate system is low, which affects calibration precision. In addition, because the calibration board is manually moved, a position of the calibration board cannot be accurately determined, which also affects the calibration precision. Calibration of different parameters requires calibration boards obtained by printing different patterns on boards of different materials. The calibration boards are independent of each other. In addition, illumination conditions, shapes, and sizes of calibration boards for calibrating different camera parameters are different. As a result, the calibration boards cannot be reused. In addition, in a camera calibration process, to obtain a set parameter such as an intrinsic parameter and an extrinsic parameter of the camera and a parameter such as a lens distortion of the camera, the calibration board needs to be moved to different local positions in the field of view of the camera. The method of manually moving the calibration board or moving the calibration board by the robot arm is time-consuming and labor-consuming, and reduces calibration efficiency. In addition, the calibration process is completely repeated by manually moving the calibration board or moving the calibration board by the robot arm. This makes it difficult to reproduce a problem that occurs in the calibration process.

To resolve the foregoing technical problems, the embodiments of the present disclosure provide a parameter calibration method and apparatus. The method and the apparatus may be applied to calibration of consumer cameras and industrial cameras, to obtain parameters such as an intrinsic parameter, an extrinsic parameter, a lens distortion parameter, a white balance parameter, a chromatic aberration, and an MTF of a camera. The consumer camera may include, for example, a camera or a camera array configured to be installed in a mobile phone, a tablet computer, a photographing device, a virtual/hybrid/augmented reality device, an unmanned aerial vehicle with a camera, or a camera-based driving assistant device/system. The industrial camera may include, for example, a surveillance camera and a ranging/speed measurement camera that are applied to an industrial scenario, and a camera or a camera array included in the industrial camera.

Figure 7:
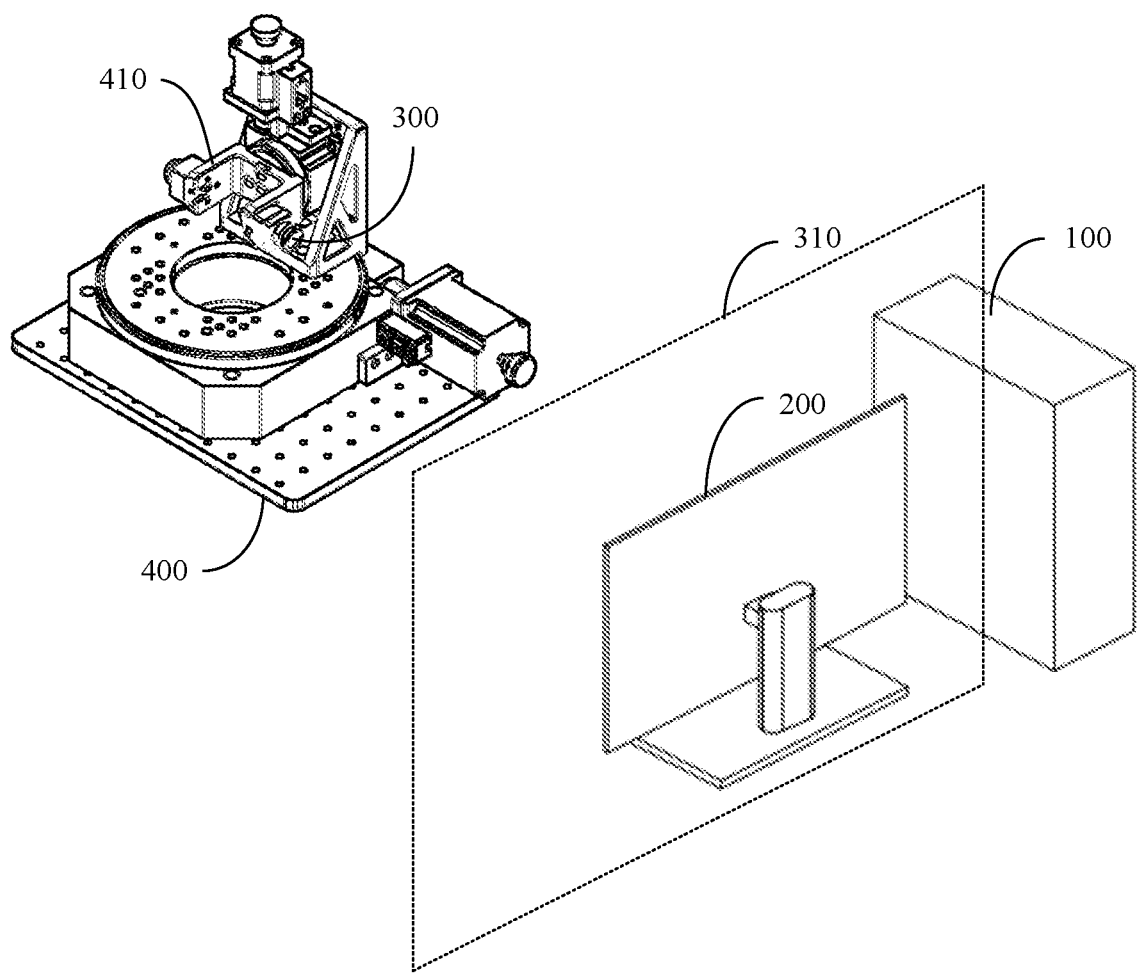
FIG. 7 is a schematic diagram of a hardware system for parameter calibration according to an embodiment of the present disclosure.

For example, FIG. 7 provides a hardware system. As shown in FIG. 7, the hardware system may include, for example, a control device 100, a display screen 200, an image shooting device 300, and a motion mechanism 400. The control device 100 establishes communication connections to the display screen 200, the image shooting device 300, and the motion mechanism 400. In the embodiments of the present disclosure, the display screen 200 may be configured to display calibration patterns, calibration results, and other information. The motion mechanism 400 includes at least one installation position 410 configured to install a camera. Each installation position 410 may be configured to install at least one to-be-calibrated image shooting device 300. Each image shooting device 300 includes at least one to-be-calibrated camera. When the image shooting device 300 includes two or more cameras, the hardware system may be configured to perform binocular or multi-eyepiece calibration on the two or more cameras, and calibrate a camera array including a plurality of cameras. The motion mechanism 400 may drive the installation position to generate displacement or rotation, to change a pose of the camera. In addition, the display screen 200 and the motion mechanism 400 in the hardware system need to have the following position relationship: The display screen 200 is disposed facing a field 310 of view of the camera, so that when the motion mechanism 400 drives the pose of the camera to change, the display screen 200 can appear at different positions in the field 310 of view of the camera.

Figure 8:
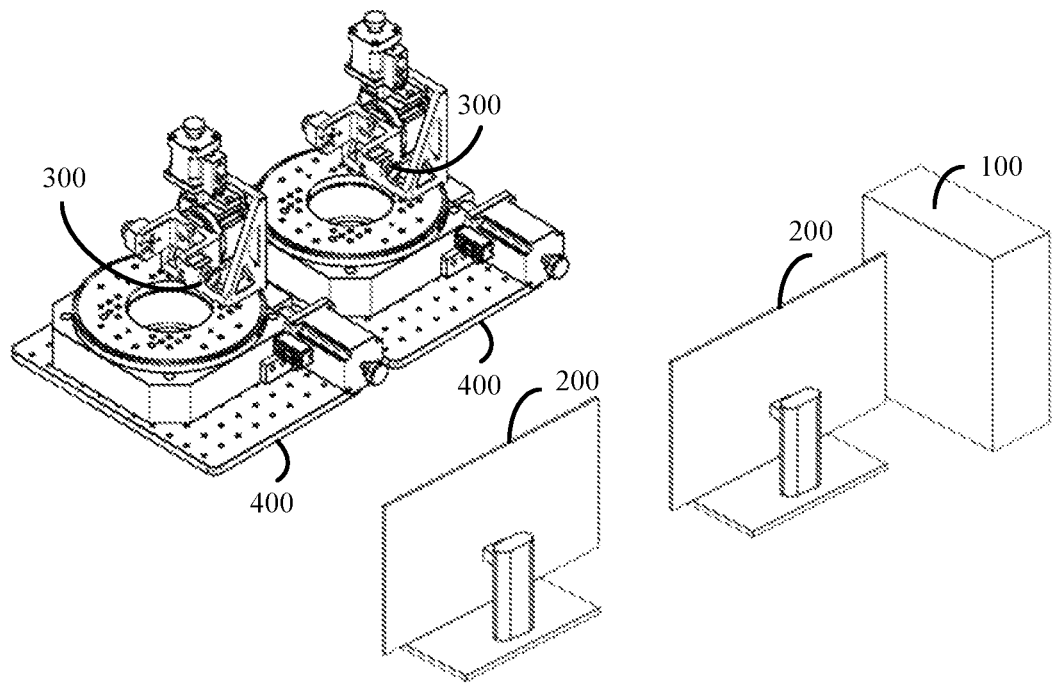
FIG. 8 is a schematic diagram of a hardware system for parameter calibration according to an embodiment of the present disclosure.

It should be additionally noted that, the hardware structure shown in FIG. 7 is merely used to describe feasibility of implementing a pose change of the image shooting device relative to the display screen, and does not constitute a specific limitation on the method and the hardware system in the embodiments of the present disclosure. For example, in some other implementations, as shown in FIG. 8, a plurality of control devices 100, and/or a plurality of display screens 200, and/or a plurality of motion mechanisms 400 may be included. A specific implementation of the hardware structure is not limited in the embodiments of the present disclosure.

Figure 9:
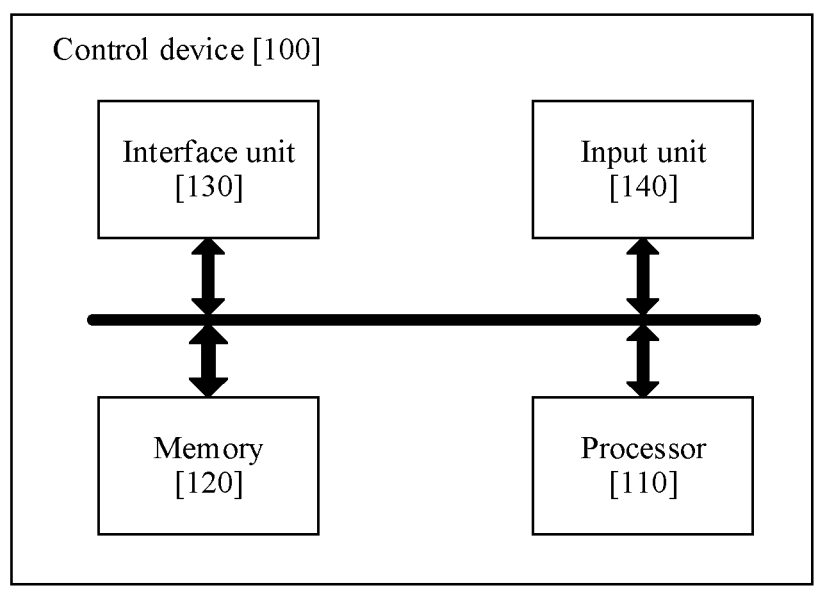
FIG. 9 is a schematic structural diagram of a control device according to an embodiment of the present disclosure.

FIG. 9 is a schematic structural diagram of the control device 100 according to an embodiment of the present disclosure. The control device 100 may include, for example, a device such as a computer, a mobile phone, a tablet computer, or an embedded system. As shown in FIG. 9, the control device 100 may include a processor 110, a memory 120, an interface unit 130, and an input unit 140. The processor 110, the memory 120, the interface unit 130, and the input unit 140 are coupled and connected. The memory 120 stores readable program instructions. The processor 110 is configured to read and execute the program instructions in the memory 120, to perform related steps of the parameter calibration method in the embodiments, for example, send an instruction to the motion mechanism by using the interface unit 130, so that the motion mechanism drives the image shooting device to generate displacement or rotation; or send an instruction to the image shooting device by using the interface unit 130, so that the image shooting device captures an image or records a video. The memory 120 may further store a document material corresponding to a calibration pattern. The processor 110 may read and decode the document material, and send the calibration pattern to the display screen for displaying. The memory 120 may be further configured to store a result file, an intermediate result file, a log, debugging information, and other information that are generated in a calibration process.

In this embodiment of the present disclosure, the processor 110 of the control device 100 may include one or more processing units, for example, a system on a chip (SoC), a central processing unit (CPU), a microcontroller (MCU), and a storage controller. Different processing units may be independent components, or may be integrated into one or more processors 110.

In this embodiment of the present disclosure, the memory 120 of the control device 100 may include one or more storage units, for example, may include a volatile memory, such as a dynamic random-access memory (DRAM), or a static random-access memory (SRAM); and may further include a non-volatile memory (NVM), such as a read-only memory (ROM), a flash memory, a hard disk drive (HDD), and a solid-state drive (SSD). Different storage units may be independent components, or may be integrated or packaged in one or more processors 110 or interface units 130 as a part of the processor 110 or the interface unit 130.

In this embodiment of the present disclosure, the interface unit 130 of the control device 100 may include, for example, a network adapter, a network interface card, a local area network (LAN) adapter, a network interface controller (NIC), a modem, and an antenna. The interface unit 130 may be an independent component, or may be partially or completely integrated or packaged in the processor 110 as a part of the processor 110.

In this embodiment of the present disclosure, the input unit 140 may include, for example, a keyboard, a mouse, a touchscreen, a joystick controller, or a touchpad coupled to the processor 110.

It may be understood that the schematic structure in this embodiment of the present disclosure does not constitute a specific limitation on the control device 100. In some other embodiments of the present disclosure, the control device may include more or fewer components than those shown in the figure, or have some components combined, or have some components split, or have a different component arrangement. The components shown in the figure may be implemented by hardware, software, or a combination of software and hardware.

Figure 10:
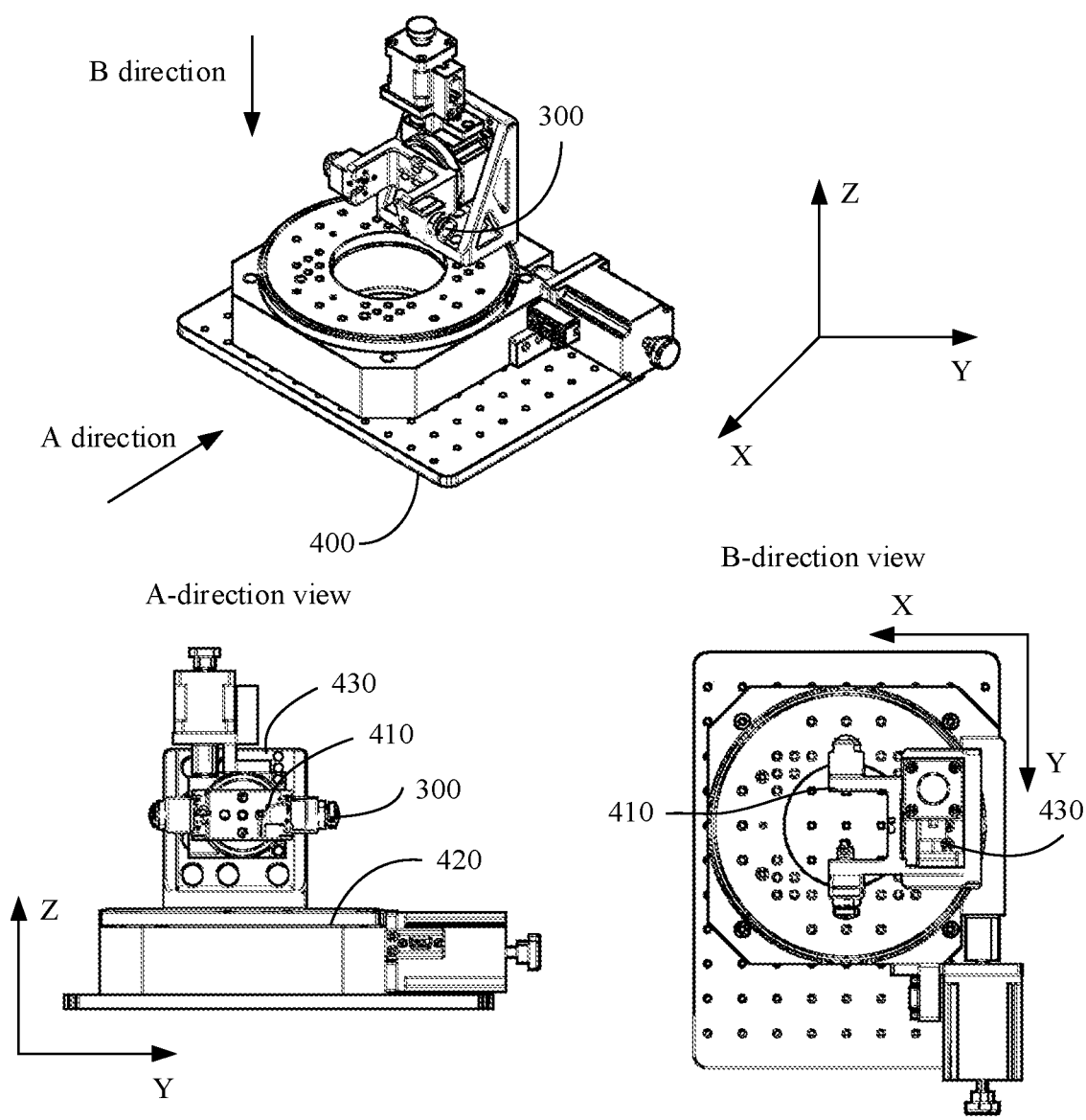
FIG. 10 is a schematic structural diagram of a motion mechanism according to an embodiment of the present disclosure.

FIG. 10 is a schematic structural diagram of the motion mechanism 400 according to an embodiment of the present disclosure. As shown in FIG. 10, the motion mechanism includes a three-axis translation mechanism 420, a two-axis rotation mechanism 430, and an installation position 410. The two-axis rotation mechanism 430 is installed on the three-axis translation mechanism 420. The installation position 410 is fixed on the two-axis rotation mechanism 430, and has a to-be-calibrated image shooting device 300 installed. The three-axis translation mechanism 420 may generate displacement along directions of an X-axis, a Y-axis, and a Z-axis in the figure, to change a position of the image shooting device 300 in the world coordinate system (that is, the real space). The two-axis rotation mechanism 430 may generate rotation by using the Y-axis and the Z-axis as rotation axes, to change a pitch angle and a horizontal angle of the image shooting device 300 in the world coordinate system.

In an implementation, the motion mechanism 400 may be driven by a motor to generate displacement or rotation. For example, the motion mechanism 400 shown in FIG. 10 may include at least one motor configured to drive the three-axis translation mechanism 420 to generate displacement and at least one motor configured to drive the two-axis rotation mechanism 430 to generate rotation. Adaptively, the motion mechanism 400 may further include a programmable controller. The controller may be coupled to the motor and the interface unit 130 of the control device 100, and is configured to drive, according to an instruction sent by the control device 100, the motor to run. It may be understood that the motion mechanism 400 may alternatively generate displacement or rotation in another manner, for example, through hydraulic driving or electromagnetic driving. This is not specifically limited herein.

It should be noted that the motion mechanism 400 provided in this embodiment of the present disclosure may have a plurality of different forms and may be implemented in a plurality of manners. Structures of the motion mechanism 400 discussed above are merely some implementations, which are used to describe feasibility of the method and the structure described in the embodiments of the present disclosure, and do not limit the protection scope of the embodiments of the present disclosure. Implementations of the motion mechanism 400 in this embodiment of the present disclosure that use another method or sequence also fall within the protection scope of the embodiments of the present disclosure.

An embodiment of the present disclosure provides a parameter calibration method. For example, the method may be applied to any control device shown in FIG. 7 to FIG. 10. Based on the hardware system shown in FIG. 7 to FIG. 10, an image shooting device in this method may include one image shooting device (for example, in FIG. 7), or may include a plurality of image shooting devices (for example, in FIG. 8). Therefore, the "image shooting device" in this embodiment of the present disclosure may also be described as "at least one image shooting device".

Figure 11:
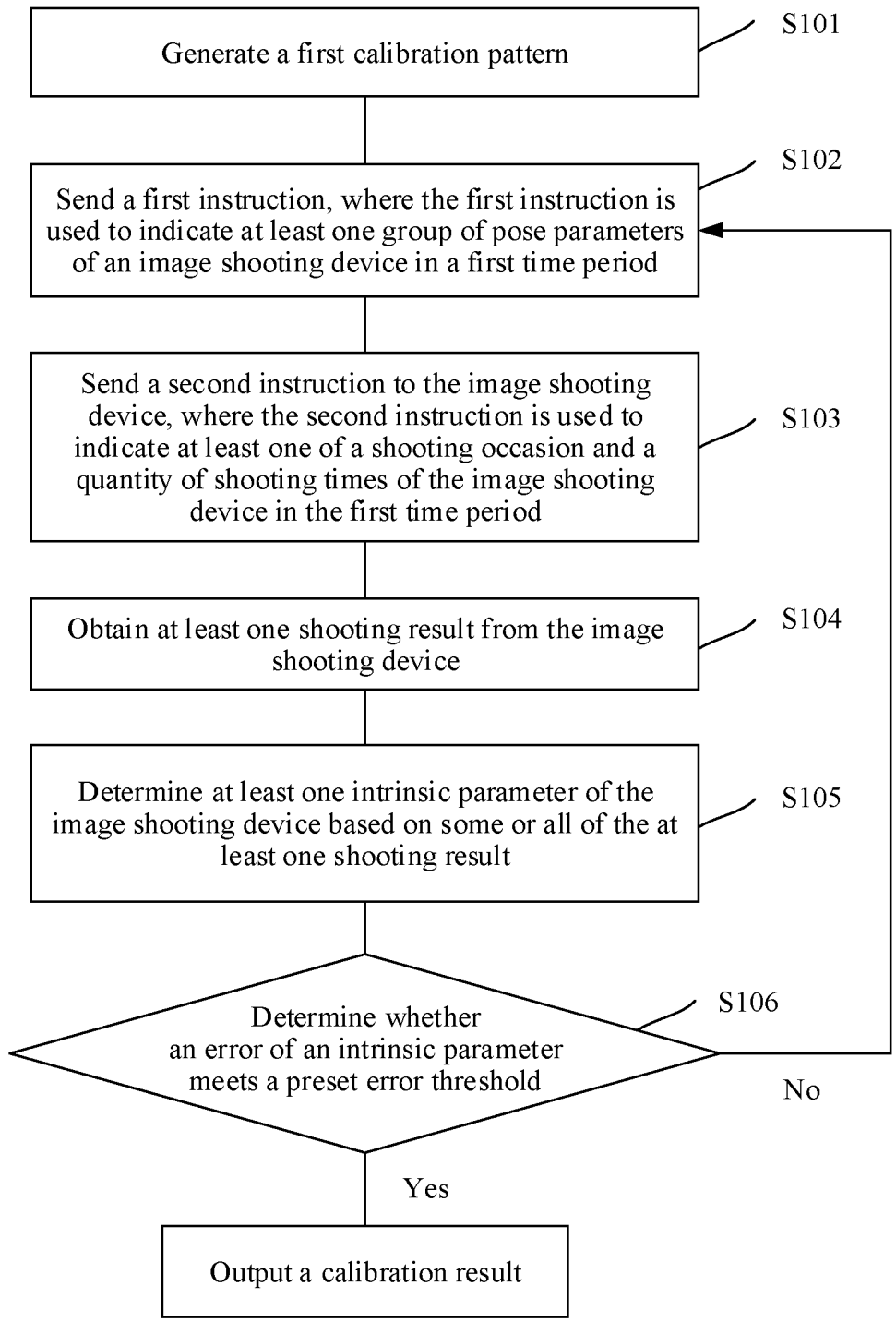
FIG. 11 is a flowchart of a parameter calibration method according to an embodiment of the present disclosure.

As shown in FIG. 11, the method includes step S101 to step S106.

Step S101. Generate a first calibration pattern.

In specific implementation, the first calibration pattern may be generated programmatically, and the first calibration pattern may dynamically change based on a calibration result of a calibration pattern previously used in this embodiment and a calibration requirement.

In an implementation, when the first calibration pattern is generated programmatically, the control device may obtain a configuration parameter corresponding to the first calibration pattern, generate the first calibration pattern based on the configuration parameter of the first calibration pattern, and send an image signal corresponding to the first calibration pattern to a display screen, so that the screen displays the first calibration pattern.

To achieve the foregoing objective, the control device may prestore configuration parameters of a plurality of calibration patterns, and select the configuration parameter of the first calibration pattern from the plurality of configuration parameters based on a preset calibration pattern generation sequence or in response to an input action performed by a user on an input unit, to generate the calibration pattern. Alternatively, the control device may display, on the display screen, an interaction interface configured to guide the user to enter a configuration parameter, so that the user enters and adjusts a configuration parameter based on a calibration requirement on the image shooting device, and the control device may further generate a corresponding first calibration pattern on the display screen in real time based on the configuration parameter entered by the user, and refresh the first calibration pattern in real time based on an adjustment made on the configuration parameter by the user, until the first calibration pattern meets a user requirement. A manner of generating the calibration pattern is not specifically limited in the present disclosure.

It may be understood that when first calibration patterns are different, configuration parameters of the calibration patterns are also different.

For example, when the first calibration pattern is a checkerboard pattern or a dot pattern, the configuration parameter may include, for example, a marker distribution area (for example, distribution in a full screen, a central area, an upper left corner, a lower left corner, a lower right corner, or a lower right corner of the display screen), a marker density (for example, a quantity of squares of the checkerboard/dots included in a display area of a unit size of the display screen), a total quantity of markers, a square size of the checkerboard/a dot size (for example, a length and a width of each square on the checkerboard or a diameter of the dot, where the length, the width, and the diameter may be determined by a quantity of pixels), a horizontal spacing and a vertical spacing between markers (the horizontal spacing and the vertical spacing may be determined by using a quantity of pixels).

In another example, when the first calibration pattern is a grayscale pattern, the configuration parameter may include, for example, parameters such as a quantity, a position, and a size of a color card, and a grayscale value and a color of each color card.

In specific implementation, the first calibration pattern may be generated based on a corresponding image file. A memory of the control device may further prestore at least one image file. Each image file includes a calibration pattern. The image file may include, for example, a checkerboard pattern, a dot matrix pattern, a grayscale pattern, a stripe pattern, or a solid-colored pattern.

In an implementation, when the memory stores the image file, the control device may select, from the at least one image file based on a preset calibration pattern generation sequence, a first image file corresponding to the first calibration pattern, decode the first image file to generate an image signal, and output the image signal to the display screen for displaying, so that the display screen displays the first calibration pattern.

In another implementation, when the memory stores the image file, the display screen may display a graphical operation interface configured to browse and select an image file, so that a user may perform different input actions based on the graphical operation interface by using an input unit. The control device selects a first image file from the at least one image file in response to an input action of the user on the input unit, generate a preview of a corresponding first calibration pattern, and send the preview to the display screen for displaying. When the user further performs an input action to confirm the selection, the control device causes the display screen to display the first calibration pattern.

It should be understood that the calibration pattern in this embodiment of the present disclosure may be implemented in a plurality of manners. The foregoing implementations are merely some implementations, and do not limit the protection scope of this embodiment of the present disclosure. Other manners of generating a calibration pattern that can be applied in this embodiment of the present disclosure also fall within the protection scope of this embodiment of the present disclosure.

It should be additionally noted that, the display screen in this embodiment of the present disclosure may use a self-luminous display screen with an active light source, to improve quality of the calibration pattern, and improve calibration quality of the image shooting device. The self-luminous display may include, for example, an organic light-emitting diode (OLED) display, an active-matrix organic light-emitting diode (AMOLED) display, and a quantum dot display. Use of the self-luminous display to display a calibration pattern has the following advantages over a conventional calibration board formed through printing:

1. The calibration pattern displayed on the display screen is controlled by the control device and can be reproduced and dynamically adjusted.

2. Calibration patterns at different positions of the display screen are not affected by changes in ambient light sources and differences in illumination conditions, so that consistency is high, thereby helping improve quality of an image captured by the image shooting device, avoiding problems such as feature point detection failure and edge detection failure in a subsequent image processing process, and helping improve calibration quality.

3. In a printing process of the conventional calibration board, a color mode is changed from another mode to a printing mode (for example, Cyan, Magenta, Yellow, and Key (CMYK)). Consequently, some colors are lost or changed. Therefore, parameters such as a chromatic aberration and a white balance of the image shooting device cannot be calibrated by using the conventional calibration board. However, the display screen can use the same color mode and color gamut as a picture captured by the image shooting device, so that parameters such as the chromatic aberration and the white balance of the image shooting device can be calibrated.

Step S102. Send a first instruction, where the first instruction is used to indicate at least one group of pose parameters of the image shooting device in a first time period.

In this embodiment of the present disclosure, a pose of the image shooting device relative to the control device may be determined by using a group of pose parameters, and each group of pose parameters may determine a pose of the image shooting device. In specific implementation, a group of pose parameters may include at least one position parameter and/or at least one angle parameter. The position parameter is used to determine a position of the image shooting device in a world coordinate system. For example, the position parameter may include some or all coordinate values of X-axis, Y-axis, and Z-axis coordinates of the image shooting device in the world coordinate system, for example, $(X_1, Y_1, Z_1)$ and $(X_2, Y_2)$, $(X_3, Z_3)$, or $(X_4)$. Optionally, when a group of pose parameters includes some position parameters, it indicates that a coordinate value corresponding to a missing position parameter of the image shooting device does not change. The angle parameter is used to determine an angle of the image shooting device relative to each coordinate axis of the world coordinate system. For example, the angle parameter may include some or all angle values of the image shooting device relative to an X-axis, a Y-axis, and a Z-axis in the world coordinate system, for example, $(\alpha_1, \beta_1, \gamma_1)$, $(\alpha_2, \gamma_2)$, $(\beta_3, \gamma_3)$, or $(\beta_4)$. Optionally, when a group of pose parameters includes some angle parameters, it indicates that a coordinate value corresponding to a missing angle parameter of the image shooting device does not change.

In specific implementation, based on the hardware system shown in FIG. 7, the control device may send a first instruction to the motion mechanism. The motion mechanism may carry at least one image shooting device, and drive, based on at least one group of pose parameters indicated by the first instruction, the image shooting device to translate and rotate, to control a pose of the at least one image shooting device.

Figure 12:
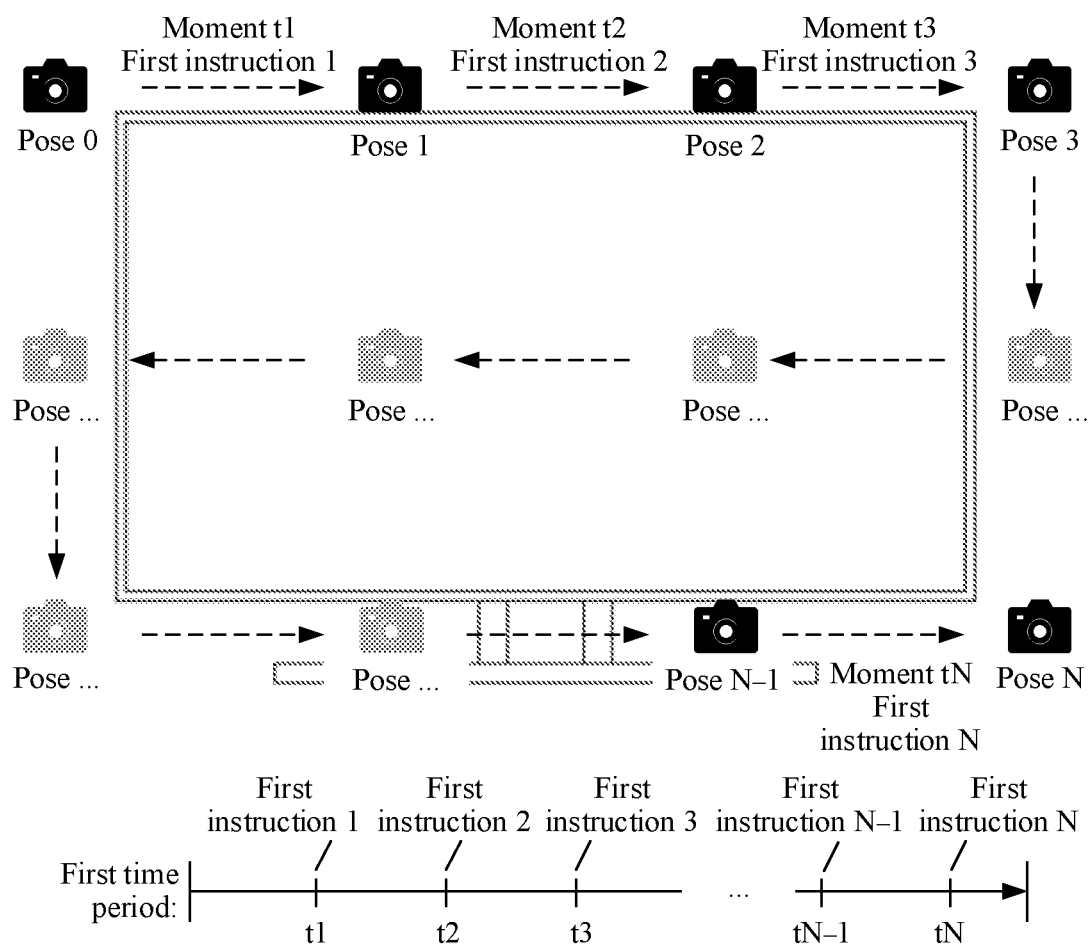
FIG. 12 is a schematic diagram of adjusting a pose of an image shooting device according to an embodiment of the present disclosure.

FIG. 12 is a schematic diagram of adjusting a pose of an image shooting device according to an embodiment of the present disclosure. As shown in FIG. 12, in an implementation, the control device may send a plurality of first instructions to the motion mechanism in the first time period. Each first instruction indicates a group of pose parameters, and different first instructions indicate different or same pose parameters. Therefore, the motion mechanism can receive the plurality of first instructions in the first time period. Each time a first instruction is received, the motion mechanism performs translation and rotation once based on a pose parameter indicated by the first instruction, to adjust the image shooting device to a corresponding pose. Optionally, the plurality of first instructions in the first time period may be sequentially sent at different moments.

For example, as shown in FIG. 12, at N (N is a natural number) moments in the first time period, the control device sends a first instruction 1 to a first instruction N to the motion mechanism. The first instruction 1 to the first instruction N respectively indicate a first group of pose parameters to an $N^{th}$ group of pose parameters. In this case, at a moment t1, the control device sends the first instruction 1 to the motion mechanism, to adjust the pose of the image shooting device from an initial pose 0 to a pose 1; at a moment t2, the control device sends the first instruction 2 to the motion mechanism, to adjust the pose of the image shooting device from the pose 1 to a pose 2; at a moment t3, the control device sends the first instruction 3 to the motion mechanism, to adjust the pose of the image shooting device from the pose 2 to a pose 3; . . . ; and at a moment tN, the control device sends the first instruction N to the motion mechanism, to adjust the pose of the image shooting device from a pose N−1 to a pose N.

Figure 13:
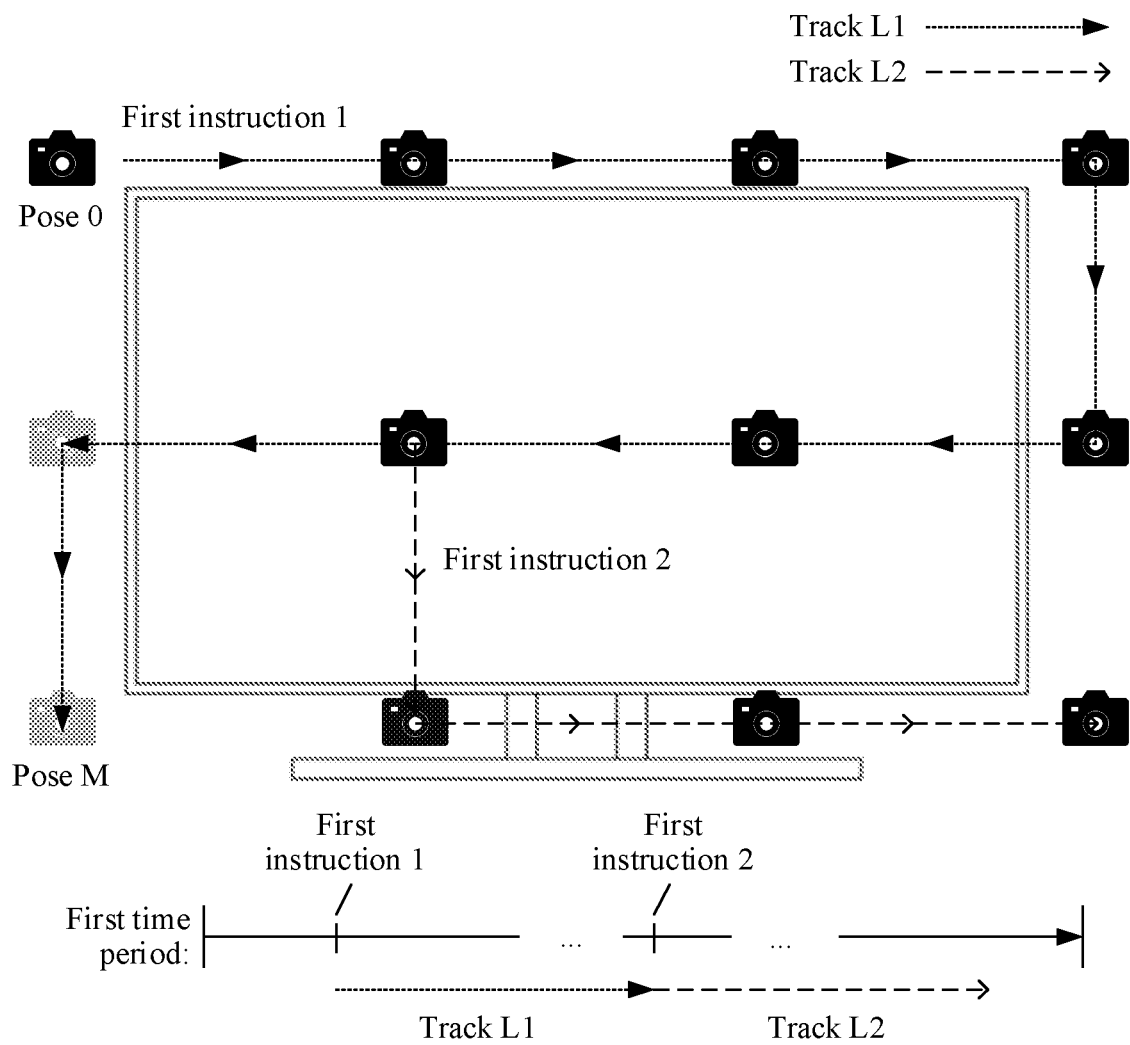
FIG. 13 is a schematic diagram of adjusting a pose of an image shooting device according to an embodiment of the present disclosure.

FIG. 13 is a schematic diagram of adjusting a pose of an image shooting device according to an embodiment of the present disclosure. As shown in FIG. 3, in an implementation, the control device may send only one first instruction in the first time period. The first instruction includes a plurality of different pose parameters, and the plurality of different pose parameters can be connected to form a movement track and an angle change trend of the image shooting device. Therefore, after receiving the first instruction, the motion mechanism may drive the camera to move along the movement track indicated by the first instruction, and adjust an angle of the image shooting device in a movement process, so that the image shooting device has different poses in the first time period.

For example, as shown in FIG. 13, at a moment in the first time period, the control device sends a first instruction 1 to the motion mechanism. The first instruction 1 indicates a movement track L1 by using a plurality of different first group of pose parameters to $M^{th}$ group of pose parameters (M is a natural number). In response to the first instruction 1, the motion mechanism moves the image shooting device along the track L1, so that the pose of the image shooting device changes from a pose 0 to a pose M. In the change process, if the motion mechanism receives a new first instruction 2, the motion mechanism may interrupt the process of movement along the track L1, and continue to adjust the pose of the image shooting device along a track L2 indicated by the new first instruction 2. Alternatively, if the motion mechanism receives the new first instruction 2, the motion mechanism may continue to move along the track L1, and after the movement along the track L1 is completed, continue to adjust the pose of the image shooting device along the track L2 indicated by the new first instruction 2.

In an implementation, based on the motion mechanism shown in FIG. 10, the first instruction may indicate the pose parameter of the image shooting device in the following manner: The first instruction may include at least one control parameter of the motion mechanism, for example, distances, linear velocities, and/or displacement durations of displacement of the three-axis translation mechanism along the X-axis, the Y-axis, and the Z-axis, and angles, angular velocities, and/or rotation durations of rotation of the two-axis rotation mechanism around the Y-axis and the Z-axis. The control parameter may be sent to the controller of the motion mechanism, so that the controller determines information such as a rotation direction, a rotation speed, and a rotation duration of the motor based on the control parameter, and then drives the motor to run, so that the three-axis translation mechanism and the two-axis rotation mechanism generate displacement or rotation corresponding to the control parameter, to adjust the image shooting device to a corresponding pose.

Step S103. Send a second instruction to the image shooting device, where the second instruction is used to indicate at least one of a shooting occasion and a quantity of shooting times of the image shooting device in the first time period.

In specific implementation, the image shooting device performs shooting at least once, including capturing a photo and/or capturing a video.

In an implementation, when the image shooting device captures a photo, the control device may alternately send a plurality of first instructions and a plurality of second instructions to the image shooting device in the first time period. Each time a second instruction is received, the image shooting device correspondingly captures a photo. Because the pose parameter of the image shooting device changes in the first time period, the image shooting device can capture a plurality of photos with different pose parameters. In the plurality of photos, the calibration pattern on the display screen may completely or partially appear in the photos, and in different photos, the calibration pattern may appear at different positions.

Figure 14:
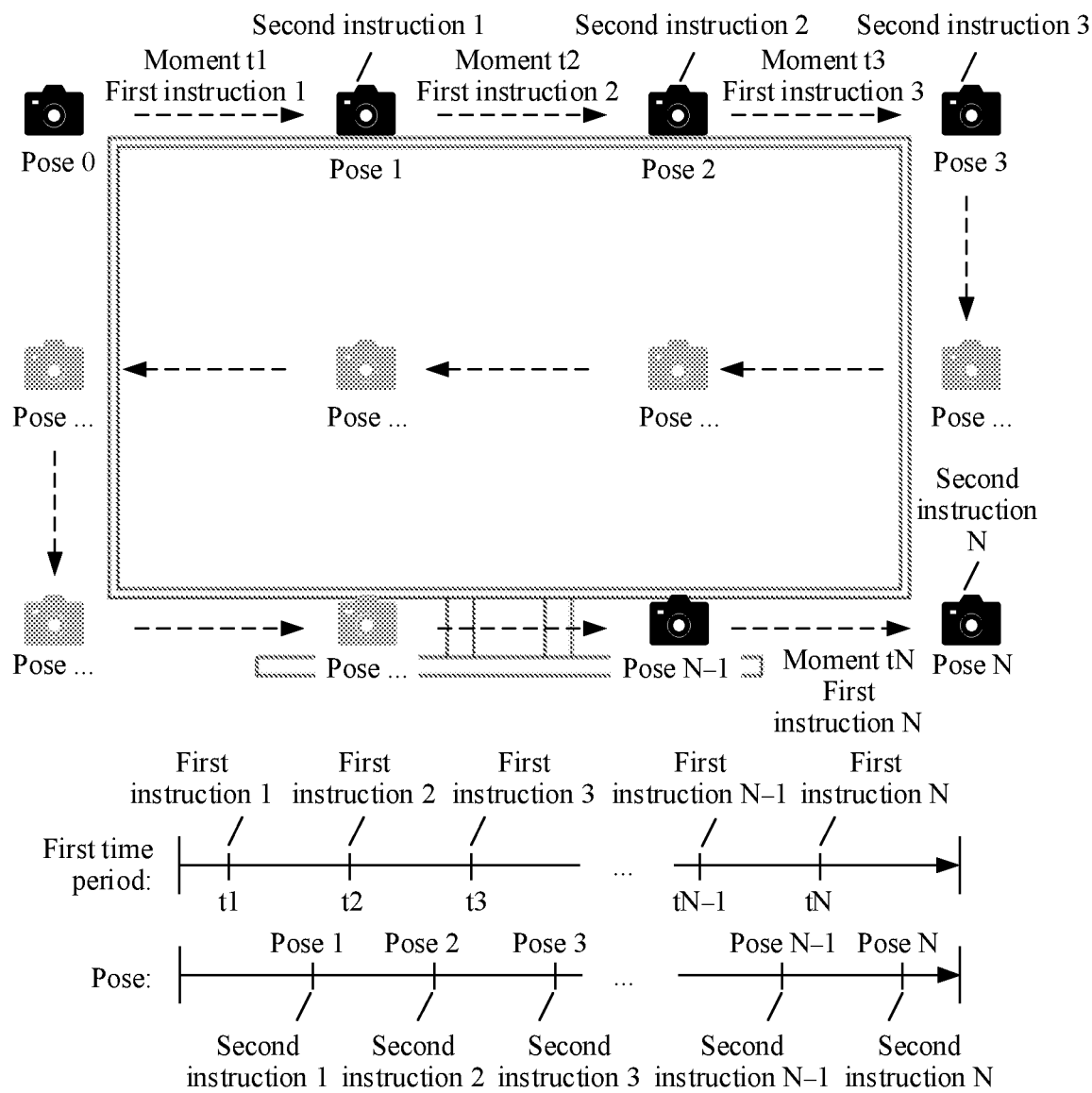
FIG. 14 is a schematic diagram of shooting by an image shooting device according to an embodiment of the present disclosure.

For example, as shown in FIG. 14, at a moment t0 in the first time period, the image shooting device is located at an upper left corner of the display screen, and the pose parameter is 0. At N (N is a natural number) moments in the first time period, the control device sequentially sends a first instruction 1 to a first instruction N to the motion mechanism, the first instruction 1 to the first instruction N respectively indicate a first group of pose parameters to an $N^{th}$ group of pose parameters, and alternately with the N first instructions, the control device further sequentially sends a plurality of (for example, N) second instructions to the motion mechanism, so that the image shooting device captures photos with different pose parameters. For example, at a moment t1, the control device sends the first instruction 1 to the motion mechanism, to adjust the pose of the image shooting device from an initial pose 0 to a pose 1. Then, the control device sends a second instruction 1 to the image shooting device, so that the image shooting device captures at least one photo in the pose 1. At a moment t2, the control device sends the first instruction 2 to the motion mechanism, to adjust the pose of the image shooting device from the pose 1 to a pose 2. Then, the control device sends a second instruction 2 to the image shooting device, so that the image shooting device captures at least one photo in the pose 2. At a moment tN, the control device sends the first instruction N to the motion mechanism, to adjust the pose of the image shooting device from a pose N−1 to a pose N. Then, the control device sends a second instruction N to the image shooting device, so that the image shooting device captures at least one photo with the $N^{th}$ group of pose parameters.

In an implementation, when the image shooting device captures a photo, the second instruction may be specifically used to indicate a time interval ΔT for the image shooting device to capture photos. Therefore, the control device may send the second instruction to the image shooting device only once. In this case, the image shooting device captures at least one photo at the interval of ΔT in a pose parameter change process. The first instruction and the second instruction may be sent at the same time, or may be sent at different time. For example, the first instruction is sent before the second instruction, or the second instruction is sent before the first instruction.

Figure 15:
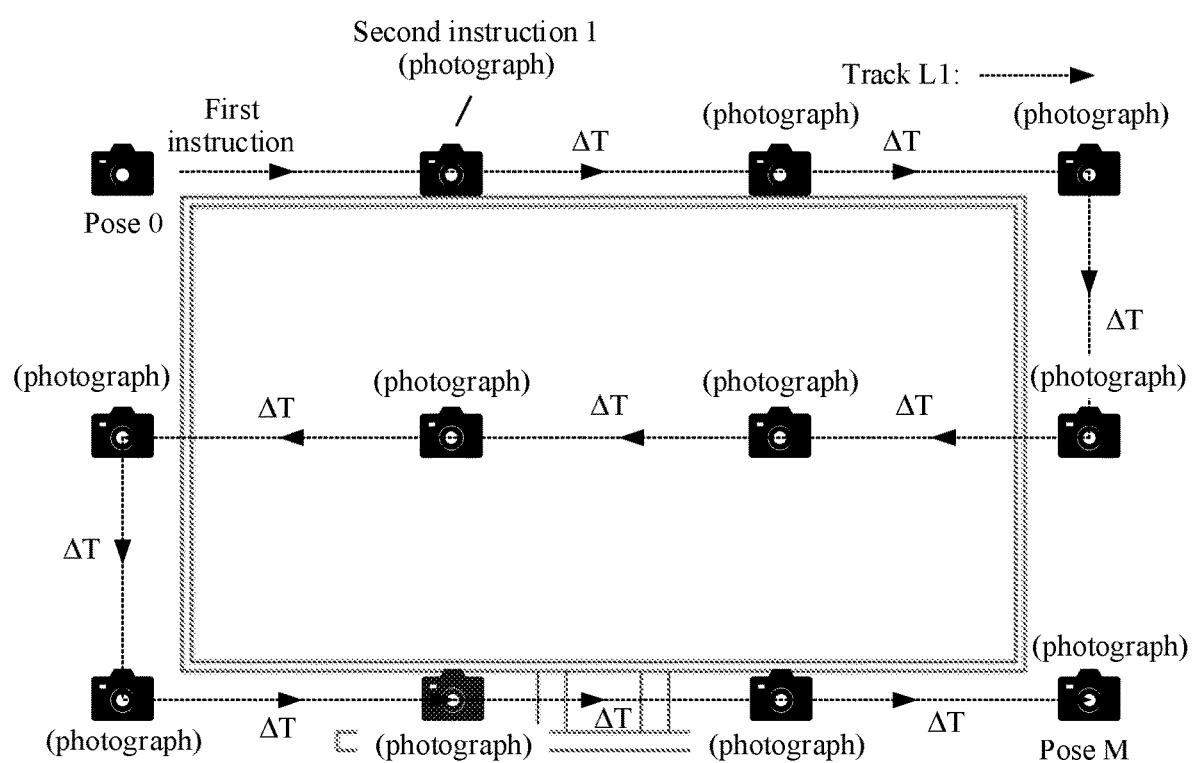
FIG. 15 is a schematic diagram of shooting by an image shooting device according to an embodiment of the present disclosure.

For example, as shown in FIG. 15, at a moment t0, the control device sends a first instruction to the motion mechanism. The first instruction indicates a track L1 by using a plurality of different first group of pose parameters to $M^{th}$ group of pose parameters (M is a natural number). In response to the first instruction, the motion mechanism moves the image shooting device along the track L1, so that the pose of the image shooting device changes from a pose 0 to a pose M. In a process in which the image shooting device moves along the track L1, the control device may send a second instruction to the image shooting device. The second instruction indicates a time interval ΔT, so that the image shooting device captures a photo at the interval of ΔT until the image shooting device finishes the movement along the track L1.

In an implementation, when the image shooting device captures a video, the control device may send the second instruction to the image shooting device only once in the first time period. After receiving the second instruction, the image shooting device immediately starts to capture a video. With the change of the pose of the image shooting device, the calibration pattern on the display screen may completely or partially appear in the video, and in different video frames, the calibration pattern may appear at different positions. The first instruction and the second instruction may be sent at the same time, or may be sent at different time. For example, the first instruction is sent before the second instruction, or the second instruction is sent before the first instruction.

Optionally, after the control device sends the second instruction to the image shooting device, the control device may further send a termination instruction to the image shooting device, so that the image shooting device stops capturing the video.

Figure 16:
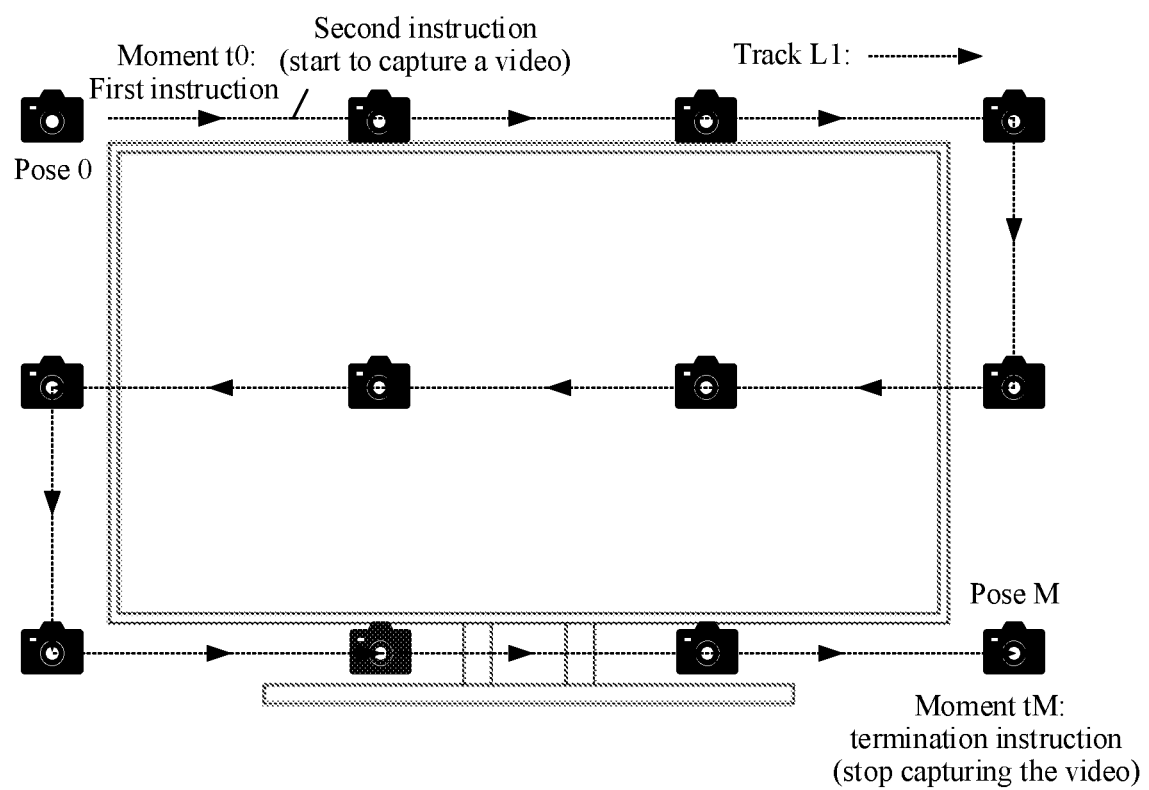
FIG. 16 is a schematic diagram of shooting by an image shooting device according to an embodiment of the present disclosure.

For example, as shown in FIG. 16, at a moment t0, the control device sends a first instruction to the motion mechanism. The first instruction indicates a track L1 by using a plurality of different first group of pose parameters to $M^{th}$ group of pose parameters (M is a natural number). In response to the first instruction, the motion mechanism moves the image shooting device along the track L1, so that the pose of the image shooting device changes from a pose 1 to a pose M. In a process in which the image shooting device moves along the track L1, the control device may send a second instruction to the image shooting device, so that the image shooting device starts to capture a video while changing the pose. At a subsequent moment tM, for example, after the image shooting device finishes the movement along the track L1, the control device sends a termination instruction to the image shooting device, so that the image shooting device stops capturing the video.

Optionally, when the second instruction is used to instruct the image shooting device to capture a video, the control device may alternately send the second instruction and the termination instruction a plurality of times, so that the image shooting device captures a plurality of video segments in the pose change process.

Figure 17:
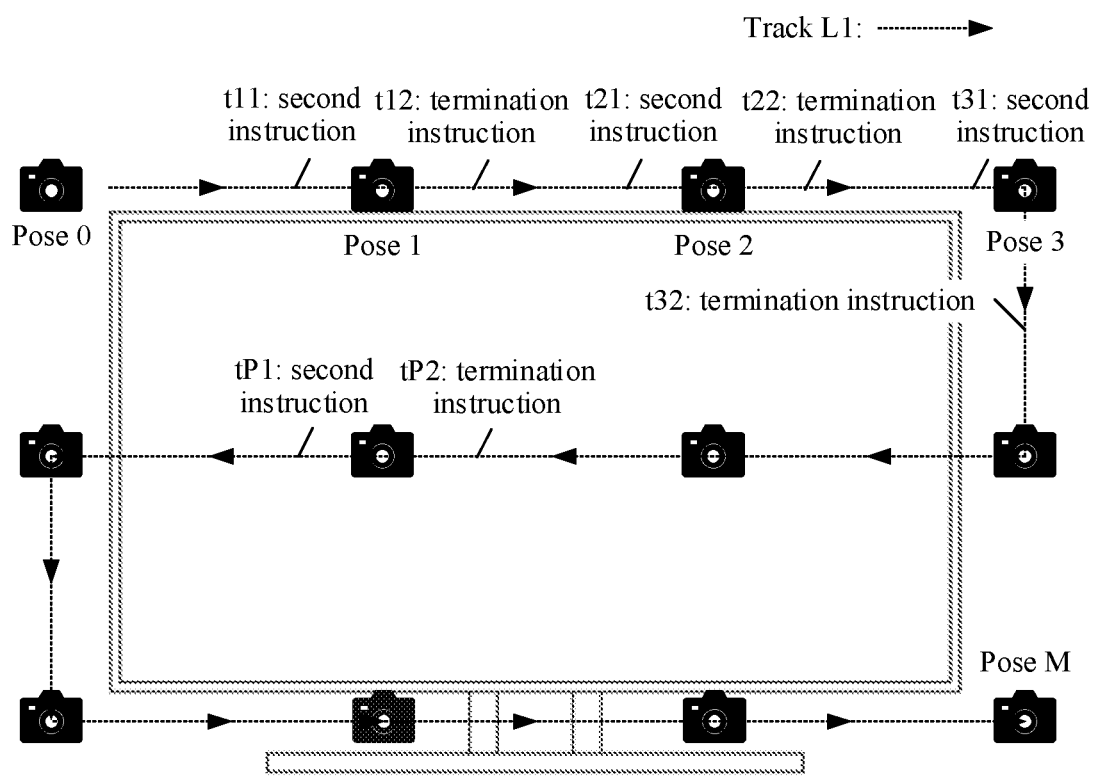
FIG. 17 is a schematic diagram of shooting by an image shooting device according to an embodiment of the present disclosure.

For example, as shown in FIG. 17, in a process in which the image shooting device moves along a track L1, the control device sends a $1^{st}$ second instruction at a moment t11, and sends a $1^{st}$ termination instruction at a moment t12, so that the image shooting device captures a video segment 1 at the moments t11 to t12. The control device sends a $2^{nd}$ second instruction at a moment t21, and sends a $2^{nd}$ termination instruction at a moment t22, so that the image shooting device captures a video segment 2 at the moments t21 to t22. The control device sends a $P^{th}$ second instruction at a moment tP1 (P is a natural number), and sends a $P^{th}$ termination instruction at a moment tP2, so that the image shooting device captures a video segment P at the moments tP1 to tP2. The moment t11 may be, for example, before the image shooting device moves to a pose 1, and the moment t12 may be, for example, after the image shooting device moves to the pose 1, so that the video segment 1 includes a video frame captured by the image shooting device in the pose 1. The moment t21 may be, for example, before the image shooting device moves to a pose 2, and the moment t22 may be, for example, after the image shooting device moves to the pose 2, so that the video segment 2 includes a video frame captured by the image shooting device in the pose 2. The moment t31 may be, for example, before the image shooting device moves to a pose 3, and the moment t32 may be, for example, after the image shooting device moves to the pose 3, so that the video segment 3 includes a video frame captured by the image shooting device in the pose 3.

Step S104. Obtain at least one shooting result from the image shooting device.

In specific implementation, the shooting result includes a photo and/or a video captured by the image shooting device. The image shooting device may return the captured photo and video to the control device, and the control device stores, in the memory, the photo and the video that are returned by the image shooting device, for use in calculating an intrinsic parameter of the image shooting device in a subsequent step. For example, the image shooting device may send analog signals of the photo and the video to a data acquisition card, and the capture card performs analog-to-digital conversion on the signals, and then sends digital signals of the photo and the video that are obtained through the conversion to the control device for storage.

Step S105. Determine at least one intrinsic parameter of the image shooting device based on some or all of the at least one shooting result.

Any one of the "some or all shooting result" should include a part or all of the first calibration pattern. Further, optionally, the "some or all shooting result" enable the first calibration pattern to appear at different positions of the photo or the video (in other words, different positions in a field of view of the image shooting device), especially a position with a severe distortion.

In specific implementation, when the shooting result is a photo, the control device may detect and obtain a feature point from the "some or all" photos. Each feature point has pixel coordinate system coordinates in the photo and world coordinate system coordinates in the display screen. Based on the pixel coordinate system coordinates and the world coordinate system coordinates of the feature point, intrinsic parameters such as $M_1$ and $M_2$ in the foregoing formula (Formula (1)) of "conversion from the world coordinate system to the pixel coordinate system" can be solved.

In specific implementation, when the shooting result is a video, the control device may extract at least one video frame from the video, and each extracted video frame includes a part or all of the first calibration pattern. Then, the control device may detect and obtain a feature point from the at least one video frame. Each feature point has pixel coordinate system coordinates in the video frame and world coordinate system coordinates in the display screen. Based on the pixel coordinate system coordinates and the world coordinate system coordinates of the feature point, intrinsic parameters such as $M_1$ and $M_2$ in the foregoing formula (Formula (1)) of "conversion from the world coordinate system to the pixel coordinate system" can be solved.

Figure 18:
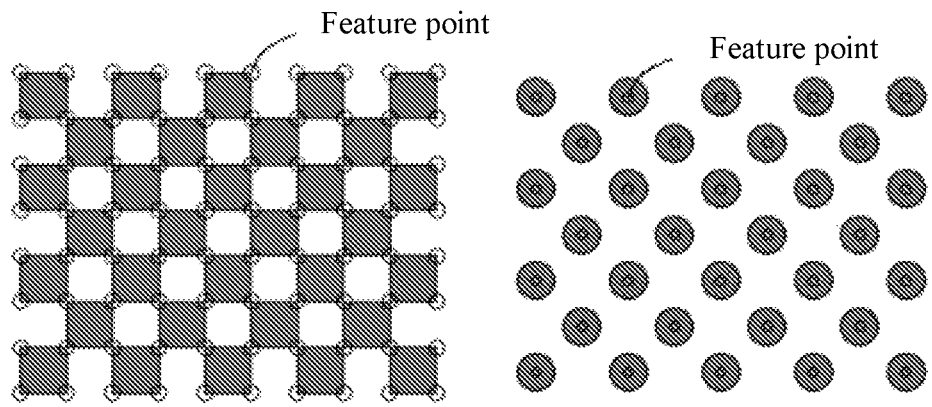
FIG. 18 is a schematic diagram of feature points.

As shown in FIG. 18, a feature point may be a point that can be easily recognized from the first calibration pattern. For example, a feature point of a checkerboard calibration pattern may be a corner point of each square, and a feature point of a dot calibration pattern may be a center point of each dot. The feature point may be obtained by performing methods such as binarization processing and edge detection on the photo or the video frame.

Step S106. Determine whether an error of at least one target intrinsic parameter in the at least one intrinsic parameter meets an error threshold respectively corresponding to the at least one target intrinsic parameter. If an error of any target intrinsic parameter does not meet an error threshold corresponding to the any target intrinsic parameter, return to step S102. If all target intrinsic parameters meet error thresholds respectively corresponding to the target intrinsic parameters, output a calibration result.

In specific implementation scenarios, a person skilled in the art may have different requirements on calibration of the image shooting device. For example, in some implementation scenarios, a person skilled in the art expects to calibrate all intrinsic parameters of the image shooting device, while in some other implementation scenarios, a person skilled in the art expects to calibrate only some intrinsic parameters of the image shooting device. To facilitate distinguishing between an intrinsic parameter that needs to be calibrated and an intrinsic parameter that does not need to be calibrated, the intrinsic parameter that needs to be calibrated herein is referred to as a target intrinsic parameter. It may be understood that there may be one or more target intrinsic parameters, and the target intrinsic parameters may be all or some parameters of the "at least one intrinsic parameter".

In this embodiment of the present disclosure, as shown in Formula (1), some or all intrinsic parameters are included in the intrinsic parameter matrix. Therefore, a process of solving an intrinsic parameter may actually be a process of solving the intrinsic parameter matrix. When all the intrinsic parameters or target intrinsic parameters meet error thresholds corresponding to the intrinsic parameters or the target intrinsic parameters, it may be considered that the intrinsic parameter matrix is accurate and meets an output condition. Therefore, in step S106, if all the target intrinsic parameters meet the error thresholds respectively corresponding to the target intrinsic parameters, a calibration result is output. If an error of any target intrinsic parameter does not meet an error threshold corresponding to the any target intrinsic parameter, step S102 needs to be performed for further calibration, so that the intrinsic parameter matrix is iteratively updated, to obtain more accurate intrinsic parameters.

In this embodiment of the present disclosure, the error of the intrinsic parameter may include, for example, repetition precision or a reprojection error. In this embodiment of the present disclosure, it may be considered by default that an intrinsic parameter obtained during the first calibration is inaccurate. Therefore, after the first calibration, step S102 is performed for a second calibration and subsequent repeated calibration, to calculate a calibration error.

The repetition precision refers to a deviation between a plurality of intrinsic parameters obtained by repeatedly performing a plurality of calibrations in a same calibration environment. A smaller deviation indicates a smaller error of the intrinsic parameter. A larger deviation indicates a larger error of the intrinsic parameter. The same calibration environment means that some or all of the following items used in at least two calibrations are the same: calibration patterns, pose change tracks of the image shooting device, brightness and contrast of the display screen, quantities of feature points, extraction precision, quantities of photos or video frames used to calculate a calibration result, shooting poses, and the like.

In specific implementation, at least one parameter in the intrinsic parameter may have a corresponding error threshold, and the error threshold may correspond to repetition precision or a reprojection error, for example, a focal length threshold, an optical center threshold, a pixel size threshold, an optical distortion threshold, or a white balance threshold. In this case, for example, during calculation of the repetition precision, if a deviation between focal lengths of the at least two calibrations is greater than the focal length threshold, and/or a deviation between optical centers of the two calibrations is greater than the optical center threshold, and/or a deviation between pixel sizes of the two calibrations is greater than the pixel size threshold, and/or a deviation between optical distortions of the two calibrations is greater than the optical distortion threshold, and/or a deviation between white balances of the two calibrations is greater than the white balance threshold, step S102 needs to be performed for further calibration.

In addition, projection calculation is performed on a coordinate point in the world coordinate system by using an intrinsic parameter and an extrinsic parameter of the image shooting device that are obtained through calibration, so that a projection value of the coordinate point in the pixel coordinate system can be obtained. Moreover, the coordinate point further corresponds to an observation value of the pixel coordinate system in a shooting result of the image shooting device. An error between the projection result and the observation result is a reprojection error. A smaller reprojection error indicates a smaller error of the intrinsic parameter. A larger reprojection error indicates a larger error of the intrinsic parameter.

In specific implementation, for example, repeated calibration may be performed in the following manner:

Manner 1: The calibration pattern may be changed.

Figure 19:
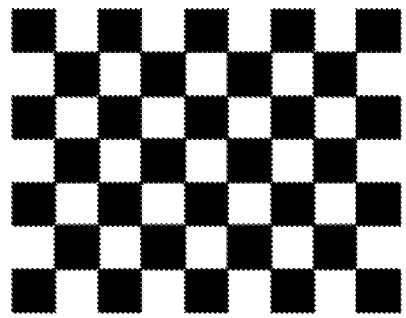
FIG. 19 is a schematic diagram of adjusting a calibration pattern by a control device.
Figure 19:
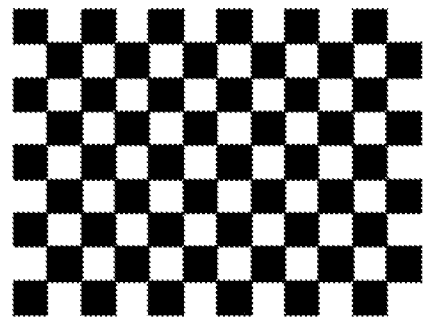

For example, as shown in FIG. 19, when an intrinsic parameter of the image shooting device is calibrated by using a checkerboard pattern or a dot pattern (for example, a first calibration pattern), the calibration pattern is fixed in one calibration process, that is, a quantity and a size of markers remain unchanged. In this case, if calibration precision does not meet a precision requirement, a reason may be that a quantity of feature points is insufficient. Therefore, during a next calibration, a new calibration pattern (for example, a second calibration pattern) may be obtained by reducing the size of the markers and increasing the quantity of the markers, to increase a quantity of feature points extracted by the control device from the shooting result in step S105, to improve calibration precision.

Figure 20:
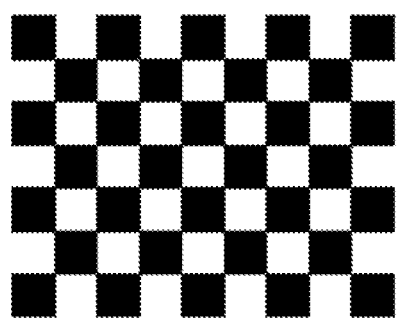
FIG. 20 is a schematic diagram of adjusting a calibration pattern by a control device.
Figure 20:
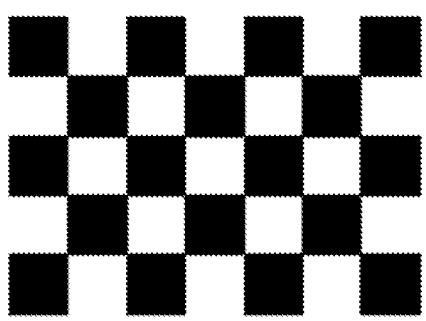

For example, as shown in FIG. 20, when an intrinsic parameter of the image shooting device is calibrated by using a checkerboard pattern or a dot pattern (for example, a first calibration pattern), if calibration precision does not meet a precision requirement, a reason may be that the calibration pattern is not clear enough, resulting in relatively poor feature point extraction precision. Therefore, during repeated calibration, a new calibration pattern (for example, a second calibration pattern) may be obtained by increasing a size of markers, to improve the feature point extraction precision.

Manner 2: Adjust a quantity of feature points that are extracted from the at least one shooting result and that correspond to each field of view of the image shooting device.

Figure 21:
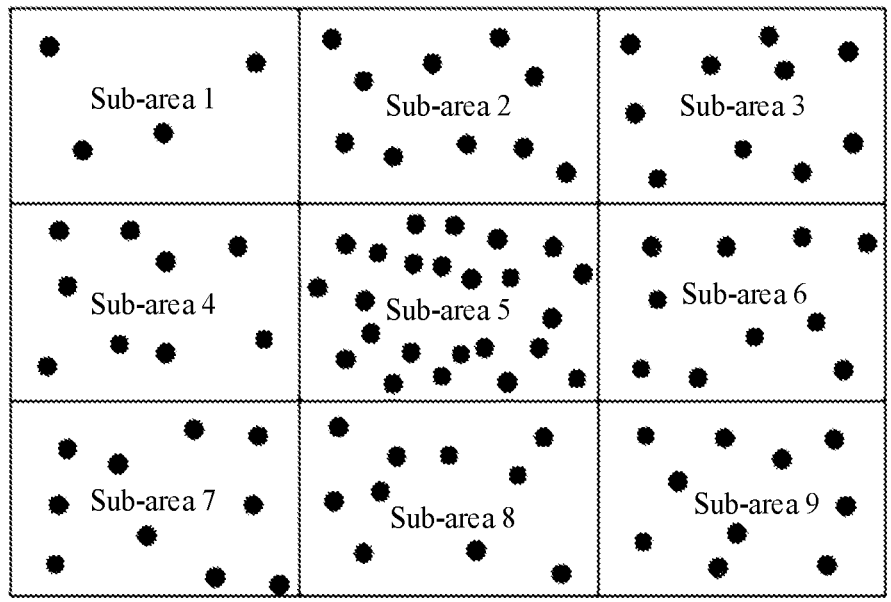
FIG. 21 is a schematic diagram of adjusting a calibration pattern by a control device.
Figure 21:
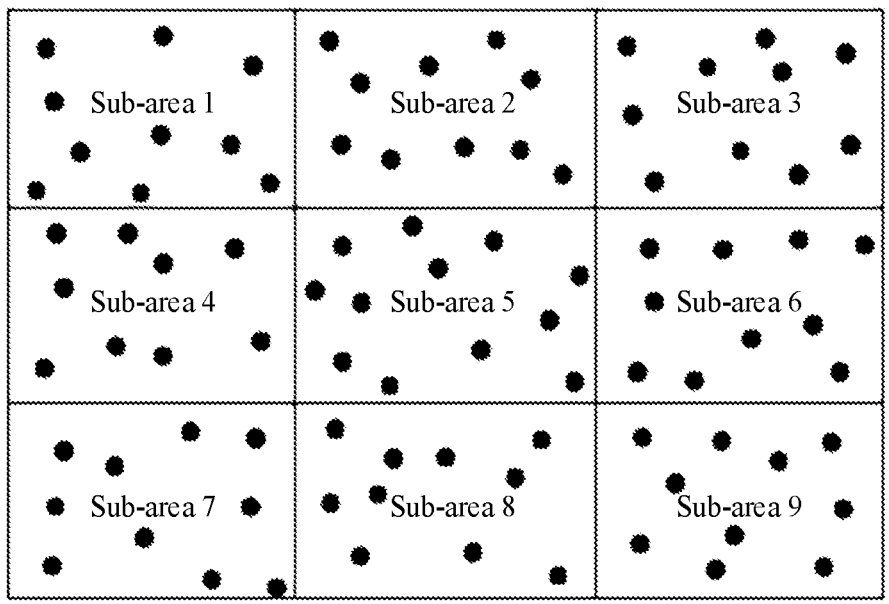

For example, as shown in FIG. 21, when an intrinsic parameter of the image shooting device is calibrated by using a checkerboard pattern or a dot pattern, if calibration precision does not meet a precision requirement, a reason may be that feature points are not evenly distributed in areas of the field of view of the image shooting device, for example, feature points are concentrated in an area, or there is no feature point or only a few feature points distributed in an area, which affects a weight of an intrinsic parameter matrix algorithm. Therefore, if feature points are concentrated in an area, during repeated calibration, some feature points in the area may be deleted or a feature point may be added to another area.

In specific implementation, as shown in FIG. 21, the field of view of the image shooting device may be divided into K sub-areas, for example, divided into a sub-area 1 to a sub-area 9 by using a nine-cell grid. After extracting feature points from the shooting result, the control device may count a quantity of feature points in each of the sub-area 1 to the sub-area 9. If a quantity of feature points in a sub-area, for example, the sub-area 5, is significantly greater than that of another sub-area (for example, a quantity of feature points in the sub-area 5 is greater than a quantity of feature points in another sub-area by a preset percentage), some nodes in the sub-area 5 are deleted, so that the quantity of feature points in the sub-area 5 is close to a quantity of feature points in any other sub-area. If a quantity of feature points in a sub-area, for example, the sub-area 1, is significantly less than that of another sub-area, the pose of the image shooting device may be moved, so that the calibration pattern is located in the sub-area 1, a video or a photo is captured again, and feature points are extracted from a video frame or a photo captured again, to supplement feature points in the sub-area 1. It should be additionally noted that, in one adjustment, the control device may perform dynamic uniformity adjustment on feature points in the sub-areas, so that quantities of feature points in the sub-areas tend to be uniform, to improve calibration precision.

Manner 3: Image quality of the calibration pattern may be adjusted.

For example, when an intrinsic parameter of the image shooting device is calibrated by using a checkerboard pattern or a dot pattern, if calibration precision does not meet a precision requirement, a reason may be that parameters such as brightness and contrast of the display screen that have impact on image quality are set improperly, or a related threshold used for binarization processing and edge detection on a shooting result is inappropriate. Therefore, during repeated calibration, the brightness and the contrast of the display screen may be changed, or the related threshold for binarization processing and edge detection may be adjusted, to improve feature point extraction precision.

It may be understood that, based on the methods of repeated calibration in the foregoing examples, in this embodiment of the present disclosure, a plurality of calibrations may be performed on the image shooting device, so that the intrinsic parameter matrix and an extrinsic parameter matrix of the image shooting device are continuously updated iteratively, and calibration precision is continuously improved until a value of the calibration precision is less than a corresponding threshold.

It should be additionally noted that, when the image shooting device is calibrated by using a checkerboard pattern or a dot pattern, field of view (FOV) ranges and depths of field of different image shooting devices may differ greatly, which may affect calibration accuracy differently. To improve calibration precision of image shooting devices with different field of view ranges and depths of field, according to the method in this embodiment of the present disclosure, in specific implementation, a calibration parameter may be dynamically adjusted based on a field of view range and a depth of field of an image shooting device. For example, when the field of view range of the image shooting device is relatively small, a quantity of markers in a calibration pattern may be properly reduced to increase a quantity of feature points in a field of view. When the field of view range of the image shooting device is relatively large, the quantity of markers in the calibration pattern may be properly increased to reduce the quantity of feature points in the field of view and improve feature point recognition precision. In addition, in a pose change process of the image shooting device, the calibration pattern should appear at different positions in the field of view of the image shooting device, especially a field of view edge of the image shooting device (the field of view edge is usually an area with a severe distortion), so that feature points extracted subsequently can be evenly distributed in the field of view of the image shooting device, to improve calibration precision.

It can be learned from the foregoing technical solution that the parameter calibration method provided in this embodiment of the present disclosure may be applied to calibration of an intrinsic parameter and an extrinsic parameter of an image shooting device. According to the method, with a position of a calibration pattern fixed, a position and an angle of the image shooting device relative to the calibration pattern are accurately adjusted by changing a pose parameter of the image shooting device, so that the image shooting device accurately photographs the calibration pattern at each given position and angle relative to the calibration pattern, to obtain at least one shooting result. The shooting result can accurately correspond to coordinates in a pixel coordinate system and a world coordinate system, so that accuracy of an intrinsic parameter and an extrinsic parameter that are correspondingly calculated is higher, and calibration precision is improved.

It may be understood that when a first calibration pattern is used, the method in this embodiment of the present disclosure may be used to calibrate a different parameter.

Figure 22:
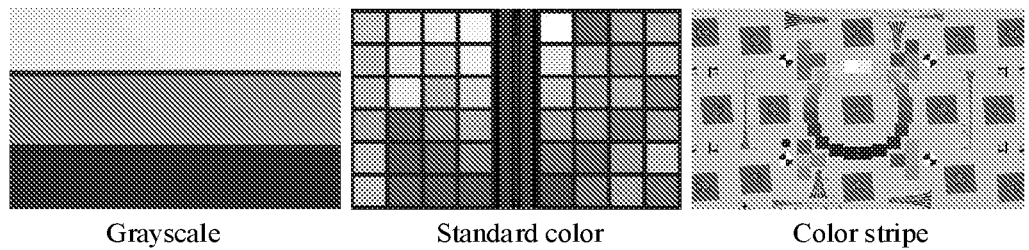
FIG. 22 is a schematic diagram of other calibration patterns according to an embodiment of the present disclosure.

For example, as shown in FIG. 22, when the first calibration pattern is a grayscale pattern including different grayscales and different colors, the method in this embodiment of the present disclosure may be used to calibrate a white balance parameter of the image shooting device. When the first calibration pattern is a monochrome pattern, a halo parameter of the image shooting device may be calculated based on a shooting result by adjusting the pose parameter of the image shooting device so that the monochrome pattern appears at different positions in the field of view of the image shooting device and a corresponding photo or video is captured. When the first calibration pattern is a calibration board pattern including lines of different angles, an optical resolution modulation transfer function MTF of the image shooting device may be calibrated by adjusting the pose parameter of the image shooting device so that the lines appear at different positions in the field of view of the image shooting device and a corresponding photo or video is captured. When the first calibration pattern is a color card pattern including a plurality of standard colors, a chromatic aberration parameter of the image shooting device may be calibrated. The calibration patterns may be preset in the control device, to be generated when required.

In the foregoing embodiments provided in the present disclosure, solutions of the data forwarding method and the data caching method provided in the present disclosure are separately described from perspectives of devices and interaction between the devices. It may be understood that, to implement the foregoing functions, each device, for example, the network device and the storage device, includes a corresponding hardware structure and/or software module for performing the functions. A person skilled in the art should easily be aware that, in combination with units and algorithm steps of the examples described in the embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the foregoing embodiments provided in the present disclosure, solutions of the parameter calibration method provided in the present disclosure are separately described from perspectives of devices/apparatuses and interaction between the devices/apparatuses. It may be understood that, to implement the foregoing functions, each device/apparatus, for example, the control device and the motion mechanism, includes a corresponding hardware structure and/or software module for performing the functions. A person skilled in the art should easily be aware that, in combination with units and algorithm steps of the examples described in the embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

For example, the control device implements a corresponding function by using a software module. The control device may include, for example, a device such as a computer, a mobile phone, a tablet computer, or an embedded system.

Figure 23:
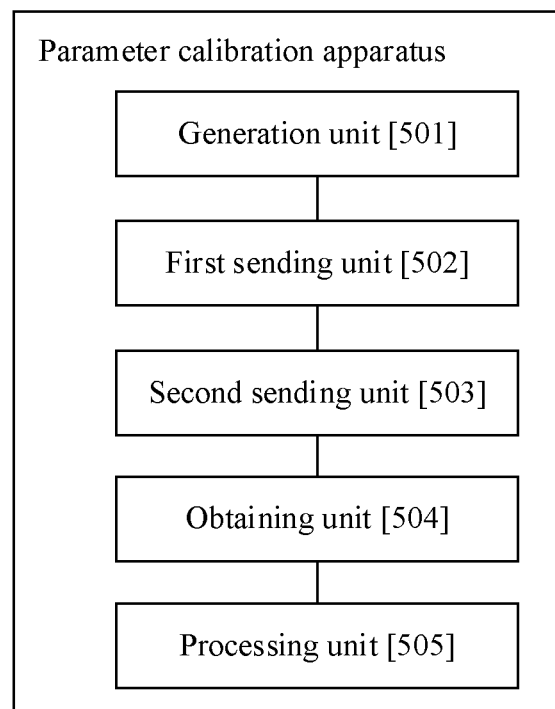
FIG. 23 is a schematic diagram of a parameter calibration apparatus according to an embodiment of the present disclosure.

In an embodiment, as shown in FIG. 23, a parameter calibration apparatus configured to implement a function of the control device includes a generation unit 501 configured to generate a first calibration pattern; a first sending unit 502 configured to send a first instruction, where the first instruction is used to indicate at least one group of pose parameters of at least one image shooting device in a first time period; a second sending unit 503 configured to send a second instruction to the image shooting device, where the second instruction is used to indicate a shooting occasion and a quantity of shooting times of the at least one image shooting device in the first time period; an obtaining unit 504 configured to obtain at least one shooting result from the at least one image shooting device; and a processing unit 505 configured to determine an intrinsic parameter of the at least one image shooting device based on some or all of the at least one shooting result, where any one of the some or all of the at least one shooting result includes a part or all of the first calibration pattern.

The parameter calibration apparatus provided in the present disclosure may be applied to calibration of an intrinsic parameter and an extrinsic parameter of an image shooting device. According to the method, with a position of a calibration pattern fixed, a position and an angle of the image shooting device relative to the calibration pattern are accurately adjusted by changing a pose parameter of the image shooting device, so that the image shooting device accurately photographs the calibration pattern at each given position and angle relative to the calibration pattern, to obtain at least one shooting result. The shooting result can accurately correspond to coordinates in a pixel coordinate system and a world coordinate system, so that accuracy of an intrinsic parameter and an extrinsic parameter that are correspondingly calculated is higher, and calibration precision is improved.

Optionally, the first sending unit 502 is further configured to send the first instruction to a motion mechanism, where the motion mechanism carries the at least one image shooting device, and the motion mechanism is configured to control a pose of at least one shooting parameter based on the at least one group of pose parameters. Therefore, the motion mechanism can accurately control the pose of the image shooting device based on the pose parameter, and can implement pose reproduction, thereby helping improve calibration precision.

Optionally, the shooting result includes at least one photo and/or at least one video from the at least one image shooting device captured in response to the second instruction. Therefore, an image that participates in calculating the intrinsic parameter of the image shooting device may be selected from the photo, or may be selected from a video frame of the video. The manner is flexible.

Optionally, a plurality of first instructions and a plurality of second instructions are included in the first time period, and the first sending unit 502 and the second sending unit 503 are further configured to alternately send the plurality of first instructions and the plurality of second instructions. Therefore, the image shooting device may be instructed based on a requirement by using the first instructions and the second instructions to capture different photos or videos in different poses, for example, placing the first calibration pattern at different positions in a field of view of the image shooting device, to improve calibration precision.

Optionally, at least one parameter in the intrinsic parameter has a corresponding error threshold; the processing unit 505 is configured to determine whether repetition precision of the at least one parameter in the intrinsic parameter is greater than the corresponding error threshold; the generation unit 501 is configured to: when the repetition precision is greater than the corresponding error threshold, adjust the first calibration pattern to a second calibration pattern, and/or adjust image quality of the first calibration pattern; and the processing unit 505 is configured to: when the repetition precision is greater than the corresponding error threshold, adjust a quantity of feature points extracted from the first calibration pattern. Therefore, in the present disclosure, a plurality of calibrations may be performed on the image shooting device, so that an intrinsic parameter matrix and an extrinsic parameter matrix of the image shooting device are continuously updated iteratively, and calibration precision is continuously improved until a value of the calibration precision is less than a corresponding threshold.

Optionally, quantities and/or sizes of markers in the first calibration pattern and the second calibration pattern are different.

Optionally, the processing unit 505 is configured to divide the first calibration pattern into at least one sub-area, and perform uniformity adjustment on a quantity of feature points in the at least one sub-area. Therefore, quantities of feature points in sub-areas tend to be uniform, to improve calibration precision.

Optionally, the first calibration pattern is a preset grayscale pattern, and the intrinsic parameter includes a white balance parameter of the at least one image shooting device.

Optionally, the first calibration pattern is a preset monochrome pattern, and the intrinsic parameter includes a halo parameter of the at least one image shooting device.

Optionally, the first calibration pattern is a preset color card pattern including a plurality of standard colors, and the intrinsic parameter includes a chromatic aberration parameter of the at least one image shooting device.

Optionally, the first calibration pattern is a preset calibration board pattern including lines of different angles, and the intrinsic parameter includes a modulation transfer function parameter of the at least one image shooting device.

In addition, for example, the device implements a corresponding function by using a hardware module.

In an embodiment, the functions of the control device may be implemented by using the structure shown in FIG. 9. For example, the interface unit 130 is configured to send a first instruction to a motion mechanism, send a second instruction to at least one image shooting device, and obtain at least one shooting result from the at least one image shooting device. The memory 120 is configured to store computer program code. The computer program code includes computer instructions. When the processor 110 executes the computer instructions, the control device is enabled to perform the method in the foregoing embodiments, for example, generating a first calibration pattern; sending the first instruction, where the first instruction is used to indicate at least one group of pose parameters of the at least one image shooting device in a first time period; sending the second instruction to the at least one image shooting device, where the second instruction is used to indicate a shooting occasion and a quantity of shooting times of the at least one image shooting device in the first time period; obtaining the at least one shooting result from the at least one image shooting device; and determining an intrinsic parameter of the at least one image shooting device based on some or all of the at least one shooting result, where any one of the some or all of the at least one shooting result includes a part or all of the first calibration pattern.

An embodiment of the present disclosure further provides a parameter calibration system. As shown in FIG. 7, the parameter calibration system includes: a control device 100 configured to generate a first calibration pattern; a display screen 200, coupled to the control device 100, and configured to display the first calibration pattern; and a motion mechanism 400 configured to carry at least one image shooting device 300, so that a field of view of the at least one image shooting device 300 faces the display screen 200, where the motion mechanism 400 is coupled to the control device 100. The control device 100 is further configured to send a first instruction to the motion mechanism 400. The first instruction is used to indicate at least one group of pose parameters of the at least one image shooting device 300 in a first time period. The motion mechanism 400 is further configured to control a pose of the at least one image shooting device 300 based on the at least one group of pose parameters. The control device 100 is further configured to send a second instruction to the at least one image shooting device 300, where the second instruction is used to indicate a shooting occasion and a quantity of shooting times of the at least one image shooting device 300 in the first time period; obtain at least one shooting result from the at least one image shooting device 300; and determine an intrinsic parameter of the at least one image shooting device 300 based on some or all of the at least one shooting result, where any one of the some or all of the at least one shooting result includes a part or all of the first calibration pattern.

An embodiment of the present disclosure further provides a computer storage medium. The computer storage medium stores computer instructions. When the computer instructions are run on a computer, the computer is enabled to perform the method in the foregoing aspects.

An embodiment of the present disclosure further provides a computer program product including instructions. When the instructions are run on a computer, the computer is enabled to perform the method in the foregoing aspects.

The present disclosure further provides a chip system. The chip system includes a processor configured to support the foregoing apparatus or device in implementing a function in the foregoing aspects, for example, generating or processing information in the foregoing method. In a possible design, the chip system further includes a memory configured to store program instructions and data for the foregoing apparatus or device. The chip system may include a chip, or may include a chip and another discrete component.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A parameter calibration method, comprising:
    generating a first calibration pattern for calibrating an image shooting device;
    sending a first instruction, wherein the first instruction indicates a group of pose parameters of the image shooting device in a first time period, and wherein the group of pose parameters indicates a pose of the image shooting device;
    sending a second instruction to the image shooting device, wherein the second instruction indicates a shooting occasion, a quantity of shooting times, or the shooting occasion and the quantity of shooting times of the image shooting device in the first time period;
    obtaining, from the image shooting device, a shooting result resulting from a shot that is based on the first instruction and the second instruction, wherein the shooting result comprises at least a portion of the first calibration pattern;
    extracting a quantity of feature points from the shooting result that correspond to a field of view of the image shooting device;

determining at least one sub-area comprised in the first calibration pattern;

performing uniformity adjustment on the quantity of feature points in the at least one sub-area; and determining at least one intrinsic parameter of the image shooting device based on the shooting result.

2. The method according to claim 1, wherein sending the first instruction comprises:

sending the first instruction to a motion mechanism, wherein the motion mechanism carries the image shooting device, and wherein the group of pose parameters is used by the motion mechanism to control the pose of the image shooting device.

3. The method of claim 1, wherein the shooting result comprises at least one image from the image shooting device captured in response to the second instruction, and wherein the image comprises a photo or a video.

4. The method of claim 1, further comprising:

determining that a repetition precision of a first parameter in the at least one intrinsic parameter is greater than a corresponding error threshold; and adjusting at least one of the first calibration pattern to a second calibration pattern or an image quality of the first calibration pattern.

5. The method of claim 4, wherein at least one of quantities or sizes of markers in the first calibration pattern and the second calibration pattern are different.

6. The method of claim 1, wherein the first calibration pattern is a preset grayscale pattern, and wherein the at least one intrinsic parameter comprises a white balance parameter of the image shooting device.

7. The method of claim 1, wherein the first calibration pattern is a preset monochrome pattern, and wherein the at least one intrinsic parameter comprises a halo parameter of the image shooting device.

8. The method of claim 1, wherein the first calibration pattern is a preset color card pattern comprising a plurality of standard colors, and wherein the at least one intrinsic parameter comprises a chromatic aberration parameter of the image shooting device.

9. The method of claim 1, wherein the first calibration pattern is a preset calibration board pattern comprising lines of different angles, and wherein the at least one intrinsic parameter comprises a modulation transfer function parameter of the image shooting device.

10. An apparatus comprising:

a processor configured to execute computer instructions to cause the apparatus to:

generate a first calibration pattern for calibrating an image shooting device;

send a first instruction, wherein the first instruction indicates a group of pose parameters of the image shooting device in a first time period, and wherein the group of pose parameters indicates a pose of the image shooting device;

send a second instruction to the image shooting device, wherein the second instruction indicates a shooting occasion, a quantity of shooting times, or the shooting occasion and the quantity of shooting times of the image shooting device in the first time period;

obtain a shooting result, that is shot according to the first instruction and the second instruction, from the image shooting device, wherein the shooting result comprises at least a portion of the first calibration pattern;

extract a quantity of feature points from the shooting result that correspond to a field of view of the image shooting device;

determine at least one sub-area comprised in the first calibration pattern;

perform uniformity adjustment on the quantity of feature points in the at least one sub-area; and determine at least one intrinsic parameter of the image shooting device based on the shooting result.

11. The apparatus of claim 10, wherein when the processor executes the computer instructions, the apparatus is enabled to perform:

sending the first instruction to a motion mechanism, wherein the motion mechanism carries the image shooting device, and wherein the group of pose parameters is used by the motion mechanism to control the pose of the image shooting device.

12. The apparatus of claim 10, wherein the shooting result comprises at least one image from the image shooting device captured in response to the second instruction, wherein the image comprises at a photo or a video.

13. The apparatus of claim 10, wherein the processor is further configured to execute the computer instructions to cause the apparatus to:

determine that a repetition precision of a first parameter in the at least one intrinsic parameter is greater than a corresponding error threshold; and adjust at least one of the first calibration pattern to a second calibration pattern or an image quality of the first calibration pattern.

14. The apparatus of claim 13, wherein at least one of quantities and sizes of markers in the first calibration pattern and the second calibration pattern are different.

15. The apparatus of claim 10, wherein the first calibration pattern is a preset grayscale pattern, and the at least one intrinsic parameter comprises a white balance parameter of the image shooting device.

16. The apparatus of claim 10, wherein the first calibration pattern is a preset monochrome pattern, and the at least one intrinsic parameter comprises a halo parameter of the image shooting device.

17. The apparatus of claim 10, wherein the first calibration pattern is a preset color card pattern comprising a plurality of standard colors, and the at least one intrinsic parameter comprises a chromatic aberration parameter of the image shooting device.

18. The apparatus of claim 10, wherein the first calibration pattern is a preset calibration board pattern comprising lines of different angles, and the at least one intrinsic parameter comprises a modulation transfer function parameter of the image shooting device.

19. A parameter calibration system comprising:

a control device configured to:

generate a first calibration pattern for calibrating an image shooting device;

send a first instruction to a motion mechanism, wherein the first instruction indicates a group of pose parameters of the image shooting device in a first time period;

send a second instruction to the image shooting device, wherein the second instruction indicates at least one of a shooting occasion and a quantity of shooting times of the image shooting device in the first time period;

obtain shooting result, that is shot according to the first instruction and the second instruction, from the image shooting device, wherein the shooting result comprises at least a portion of the first calibration pattern;

extract a quantity of feature points from the shooting result that correspond to the field of view of a image shooting device;

determine at least one sub-area comprised in the first calibration pattern;

perform uniformity adjustment on the quantity of feature points in the at least one sub-area; and determine at least one intrinsic parameter of the image shooting device based on the shooting result;

a display screen coupled to the control device, and configured to display the first calibration pattern; and the motion mechanism coupled to the control device and configured to:
  move the image shooting device, so that a field of view of the image shooting device faces the display screen; and
  control a pose of the image shooting device based on the group of pose parameters.

20. A computer program product comprising computer executable instructions that are stored on a non-transitory computer-readable medium and that, when executed by a processor, cause an apparatus to:

generate a first calibration pattern for calibrating an image shooting device;

send a first instruction, the first instruction indicating a group of pose parameters of the image shooting device in a first time period, and the group of pose parameters indicates a pose of the image shooting device;

send a second instruction to the image shooting device, the second instruction indicating at least one of a shooting occasion and a quantity of shooting times of the image shooting device in the first time period;

obtain shooting result, that is shot according to the first instruction and the second instruction, from the image shooting device, wherein the shooting result comprises at least a portion of the first calibration pattern;

extract a quantity of feature points from the shooting result that correspond to the field of view of a image shooting device;

determine at least one sub-area comprised in the first calibration pattern;

perform uniformity adjustment on the quantity of feature points in the at least one sub-area; and determine at least one intrinsic parameter of the image shooting device based on the shooting result.

21. The computer program product of claim 20, wherein the computer executable instructions when executed by the processor further cause the apparatus to:

determine that a repetition precision of a first parameter in the at least one intrinsic parameter is greater than a corresponding error threshold; and adjust at least one of the first calibration pattern to a second calibration pattern or an image quality of the first calibration pattern.

22. The computer program product of claim 20, wherein the first calibration pattern is a preset monochrome pattern, and the at least one intrinsic parameter comprises a halo parameter of the image shooting device.

* * * * *